(12) United States Patent
Harrington et al.

(10) Patent No.: US 11,503,145 B2
(45) Date of Patent: Nov. 15, 2022

(54) SMARTPHONE COMPANION DEVICE MATERIAL SENSING AND IMPROVED PHONE PERFORMANCE

(71) Applicant: Analog Devices, Inc., Norwood, MA (US)

(72) Inventors: J. Brian Harrington, Chelmsford, MA (US); David F. Bolognia, Charleston, MA (US); Alain Valentin Guery, Boston, MA (US); Vikram Venkatadri, Ayer, MA (US); Hari Chauhan, Lexington, MA (US); Evgueni Ivanov, Lexington, MA (US); Carlos R. Calvo, Framingham, MA (US)

(73) Assignee: Analog Devices, Inc., Wilmington, MA (US)

( * ) Notice: Subject to any disclaimer, the term of this patent is extended or adjusted under 35 U.S.C. 154(b) by 318 days.

(21) Appl. No.: 16/305,019

(22) PCT Filed: May 25, 2017

(86) PCT No.: PCT/US2017/034418
§ 371 (c)(1),
(2) Date: Nov. 27, 2018

(87) PCT Pub. No.: WO2017/205594
PCT Pub. Date: Nov. 30, 2017

(65) Prior Publication Data
US 2020/0322469 A1    Oct. 8, 2020

Related U.S. Application Data

(60) Provisional application No. 62/342,267, filed on May 27, 2016.

(51) Int. Cl.
*H04M 1/21* (2006.01)
*H04B 10/40* (2013.01)
(Continued)

(52) U.S. Cl.
CPC .............. *H04M 1/21* (2013.01); *H04B 10/40* (2013.01); *H04M 1/72403* (2021.01); *H04M 1/72412* (2021.01)

(58) Field of Classification Search
CPC .......................... H04B 10/40; H04B 10/0795; H04B 1/72522; H04B 1/7253; H04M 1/21;
(Continued)

(56) References Cited

U.S. PATENT DOCUMENTS 9,587,982 B2 * 3/2017 Goldring ............... G01J 3/0208
10,117,598 B1 * 11/2018 Mouradian ........ H04B 10/0795
(Continued)

FOREIGN PATENT DOCUMENTS

CN    200962084    10/2007
CN    103312839    9/2013
(Continued)

OTHER PUBLICATIONS

English Translation (via Espacenet.com) of Bibliographic Data, Description and Claims of CN200962084Y, 7 pages (see 3 above).
(Continued)

*Primary Examiner* — Matthew C Sams
(74) *Attorney, Agent, or Firm* — Akona IP PC

(57) ABSTRACT

According to one example configuration, an apparatus enhances functionality of a mobile communication device. The apparatus includes an encasement in which to retain the mobile communication device and supplemental circuitry. The supplemental circuitry is operable to: i) control an optical transmitter in the supplemental circuitry to irradiate matter under test, ii) monitor attributes of an optical signal reflected off the matter under test and received by the optical receiver; and iii) communicate the attributes of the optical signal from the supplemental circuitry to the mobile communication device over a communication link. The supple-
(Continued)

mental circuitry optionally includes multiple electrodes to further monitor attributes of the matter under test.

20 Claims, 23 Drawing Sheets

(51) Int. Cl.
  *H04M 1/72403* (2021.01)
  *H04M 1/72412* (2021.01)

(58) Field of Classification Search
  CPC .... H04M 1/26; H04W 52/02; G02B 21/0088;
    G02B 21/088; G02B 21/16; G02B
    21/245; G02B 21/361; G01N 21/255;
    G01N 33/02; G01N 2201/0221; G01N
    2021/6419; G01N 2021/6421; G01N
    21/15; G01N 21/31; G01N 21/3563;
    G01N 21/64; G01N 21/6458; G01N
    2201/129; G01N 21/00; G01J 3/0256;
    G01J 3/0291; G01J 2003/1226; G01J
    3/0264; G01J 3/0272; G01J 3/26; G01J
    3/42; G01J 2003/1213; G01J 2003/2826;
    G01J 2003/4332; G01J 3/00; G01J
    3/0202; G01J 3/0205; G01J 3/0208; G01J
    3/0278; G01J 3/0283; G01J 3/0289; G01J
    3/10; G01J 3/1256; G01J 3/2803; G01J
    3/2823; G01J 3/36; G01J 3/501; G01J
    3/513; G01J 5/10; G01J 2003/123; G01J
    2003/1239; G01J 2003/423; G01J 3/021;
    G01J 3/0216; G01J 3/0229; G01J 3/0259;
    G01J 3/0262; G01J 3/0275; G01J 3/108;
    G01J 3/12; G01J 3/28; G01J 3/45; G01J
    5/0265; G06T 1/0007; G06T 1/20; G06T
    2207/10056; G06T 2207/10064; G06T
    2207/10152; G06T 2207/30128; G06T
    5/002; G06T 5/006; G06T 7/50; A61B
    2562/028; A61B 5/021; A61B 5/02125;
    A61B 5/02416; A61B 5/0245; A61B
    5/14532; A61B 5/14546; A61B 5/1459;
    A61B 5/352; A61B 5/6826; A61B
    5/6833; A61B 5/6838; A61B 5/6849;
    A61B 5/7239; H04L 51/066; H04L
    51/224; H04L 51/48; H04L 51/58; H04L
    61/00; H04L 61/45; H04L 63/083; H04L
    67/12; G16H 20/60; G16H 30/40; G16H
    50/20
  See application file for complete search history.

(56) References Cited

U.S. PATENT DOCUMENTS

| | | | |
|---|---|---|---|
| 10,458,845 B2* | 10/2019 | Connor | G01N 33/02 |
| 2004/0024828 A1* | 2/2004 | Miyagi | H04L 61/15 |
| | | | 709/206 |
| 2008/0249382 A1* | 10/2008 | Oh | A61B 5/02125 |
| | | | 600/324 |
| 2012/0202514 A1* | 8/2012 | Kadirkamanathan | G06F 16/58 |
| | | | 455/456.1 |
| 2013/0242479 A1 | 9/2013 | Yoo et al. | |
| 2013/0331663 A1 | 12/2013 | Albert et al. | |
| 2015/0168365 A1* | 6/2015 | Connor | G16H 20/60 |
| | | | 356/51 |
| 2015/0263777 A1 | 9/2015 | Fraden | |
| 2015/0292948 A1* | 10/2015 | Goldring | G01J 3/108 |
| | | | 356/326 |
| 2016/0084707 A1 | 3/2016 | Scott et al. | |
| 2018/0149519 A1* | 5/2018 | Connor | G01J 3/0256 |

FOREIGN PATENT DOCUMENTS

| | | | | |
|---|---|---|---|---|
| JP | 2020053910 A * | 4/2020 | | H04N 5/30 |
| WO | 2015/035251 | 3/2015 | | |
| WO | 2015101992 | 7/2015 | | |
| WO | WO-2017223206 A1 * | 12/2017 | | G01J 3/2823 |
| WO | WO-2020206850 A1 * | 10/2020 | | G06K 9/62 |

OTHER PUBLICATIONS

International Search Report and Written Opinion issued in International Patent Application Serial No. PCT/US2017/034418 dated Sep. 7, 2017, 15 pages.

\* cited by examiner

SMARTPHONE COMPANION DEVICE MATERIAL SENSING AND IMPROVED PHONE PERFORMANCE

FIELD OF THE DISCLOSURE

The present disclosure is generally directed to apparatuses, methods, systems, etc., to provide expanded use of a mobile communication device (such as smart phone, personal digital assistant, etc.).

BACKGROUND

In recent years, there has been an increased interest by people to better understand health factors and the materials and/or compounds encountered in their daily lives. For example, health conscious individuals have demonstrated an increased desire for understanding their physiological health, the make-up or composition of their food, beverages, and/or medications; consumers have also shown an increased interest for information that would allow them to make more informed purchasing decisions, including information pertaining to the authenticity of purchased products, the materials, compounds, and/or components contained in such products, etc.

Further, agriculturists have shown an increased interest in understanding of the physiological health of plants and the make-up or composition of soil; brew-masters, vintners, and distillers have shown an increased demand for understanding materials and/or compounds sensing that would allow them to improve and/or refine their alcoholic beverage processes, just to name a few examples.

Conventional instrumentation and devices are available to satisfy at least some of these demands with regard to their need for information through biometric, materials, and/or compound sensing. However, such conventional instrumentation and devices have heretofore been too bulky, too slow, too inaccurate, and/or too expensive to be practical for the everyday person. Moreover, such conventional instrumentation and devices have generally failed to take full advantage of the functionality, technology, and convenience currently available from smartphones, which over the years have become ubiquitous throughout the world.

SUMMARY OF THE DISCLOSURE

This disclosure includes the observation that mobile communication devices such as smart-phones, personal digital assistants, etc., provide limited capabilities to respective users. Embodiments herein include ways to enhance use of a mobile communication device via an apparatus including an encasement and corresponding supplemental circuitry. In one embodiment, the encasement (such as protective housing) retains both the mobile communication device and the supplemental circuitry, providing expanded functionality to the mobile communication device.

More specifically, one embodiment herein includes an apparatus in which to enhance functionality of a mobile communication device. As previously mentioned, the apparatus includes an encasement (such as protective housing) and corresponding electronic circuitry (such as supplemental circuitry) to provide expanded capabilities to the mobile communication device. The encasement retains both the mobile communication device and the electronic circuitry. In one embodiment, the supplemental circuitry includes an optical transmitter and an optical receiver. The supplemental circuitry is operable to: i) control the optical transmitter, ii) monitor the optical receiver, and iii) communicate with the mobile communication device over a communication link.

In accordance with further embodiments, the communication link is a wireless communication link between the supplemental circuitry and a respective wireless interface of the mobile communication device. The optical receiver and the optical transmitter are operable to monitor attributes of matter (such as bio-media, food, material, object, etc.) disposed external to the encasement.

The apparatus as discussed herein can be presented as any suitable form factor. For example, in one embodiment the supplemental circuitry is separate and removable with respect to the encasement. Alternatively, the electronic circuitry is fixedly integrated into the encasement.

In accordance with yet further embodiments, the supplemental circuitry is operable to receive commands over the communication link from an application on the mobile communication device. In one embodiment, the supplemental circuitry executes the commands to control the optical transmitter. The supplemental circuitry conveys attributes of an optical signal detected by the optical receiver to the application on the mobile communication device. In still further embodiments, the application is operable to generate the commands to cause the optical transmitter to irradiate a material under test with optical energy; the optical signal detected by the optical receiver represents a portion of the optical energy reflected off or transmitted through the material under test.

The supplemental circuitry optionally includes a spectrometer to perform a spectral analysis of wavelengths of the optical energy reflected off the material under test (and detected by the optical receiver) to produce spectral information indicating spectral intensity of optical energy reflected off or through the matter under test at different wavelengths. The supplemental circuitry forwards the spectral information to the application on the mobile communication device. The application uses the spectral information as a basis to identify one or more component present in the material under test.

In one embodiment, the application displays an identity of the one or more components of the material under test on a display screen of the mobile communication device for viewing by a respective user.

In accordance with yet further embodiments, the mobile communication device includes a camera in which to capture an image of material under test. The supplemental circuitry as discussed herein controls the optical transmitter to irradiate the material under test. As previously discussed, the supplemental circuitry includes a spectrometer to perform a spectral analysis of the optical energy reflected off or through the material under test. The electronic circuitry communicates results of the spectral analysis over the communication link to the application on the mobile communication device. The application uses the spectral information and the captured image of the material under test to estimate an amount of at least one component present in the material under test. The application then displays the amount of at least one component present in the material under test on a display screen of the mobile communication device.

Spectral information generated by the supplemental circuitry can be used for any suitable purpose. For example, in an alternative embodiment, the optical transmitter irradiates bio-media. The supplemental circuitry as discussed herein controls the optical transmitter to irradiate the bio-media. As previously discussed, the supplemental circuitry includes a spectrometer to perform a spectral analysis of the optical energy reflected off or through the bio-media. The electronic circuitry communicates results of the spectral analysis over the communication link to the application on the mobile communication device. Accordingly, the mobile communication device is operable to receive feedback information (spectral information, spectral analysis, etc.) of an optical signal detected by the optical receiver.

The application of the mobile communication device generates a PPG (PhotoPlethysmoGraphy) metric based on attributes of the received feedback information. The application optionally displays the PPG metric on a respective display screen of the mobile communication device.

The supplemental circuitry can further include a first electrode and a second electrode disposed on an exposed surface of the encasement to detect an impedance of bio-media in contact with the first electrode and the second electrode. The mobile communication device displays a ECG (ElectroCardioGraphy) metric on a display screen of the mobile communication device; the ECG metric is derived from the detected impedance.

In addition to sensing impedance of bio media in contact between the first electrode and the second electrode, the optical transmitter transmits an optical signal to a region of the bio-media of a user in a manner as previously discussed. For example, as previously discussed, the application of the mobile communication device also generates a PPG (PhotoPlethysmoGraphy) metric based on the feedback information (spectral analysis of a portion of the optical signal reflected off or through the bio media of the user. The application of the mobile communication device uses the ECG metric and the PPG metric to derive a blood pressure metric. In one embodiment, the mobile communication device is operable to display the blood pressure metric on the display screen of the mobile communication device, the blood pressure metric calculated based at least in part on the detected impedance and attributes of an optical signal reflected off the bio-media and detected by the optical receiver.

As previously discussed, the supplemental circuitry optionally includes a first electrode and a second electrode in communication with or monitored by the supplemental circuitry. Further embodiments herein include a clock disposed in the supplemental circuitry. The supplemental circuitry uses the clock to track timing attributes of an optical signal detected by the optical receiver and timing attributes of an impedance signal detected across the first electrode and second electrode. Inclusion of the timing attributes of the spectral information (obtained from monitoring the optical receiver for multiple optical receivers) and the timing attributes of the detected impedance enable the application of the mobile communication device to generate the blood pressure metric of a user holding the encasement in which the supplemental circuitry and the mobile communication device are retained.

In accordance with yet additional embodiments, systems and methods are disclosed for integrating an embedded wireless interface, and embedded biometric, materials, and/or compounds sensing and processing into a smartphone companion device. The embedded wireless interface of the smartphone companion device enables wireless communications between the embedded sensors and a smartphone. In one aspect, the smartphone companion device is configured as a smartphone case (also referred to herein as a "smart case"). By providing an embedded wireless interface and embedded biometric, materials, and/or compounds sensing and processing in a smartphone companion device or smart case, people's demands for information about their health factors and the materials and/or compounds they may encounter in their daily lives can be satisfied in a practical device configuration that leverages the functionality, technology, and convenience of a smartphone.

In certain embodiments, a smartphone companion device configured for use with a smartphone is disclosed that includes an embedded wireless interface, and one or more embedded biometric, materials, and/or compounds sensors. The embedded wireless interface is operative to enable wireless communications between the one or more embedded biometric, materials, or compounds sensors and the smartphone. The smartphone companion device further includes a rechargeable battery, and an energy harvester/battery charger operative to perform one or more of near-field communications (NFC) charging, radio frequency (RF) charging, and optical resonance charging of the rechargeable battery.

In certain further embodiments, the smartphone companion device includes a main assembly (such as supplemental circuitry) including a printed circuit board (PCB) containing the embedded wireless interface and the one or more embedded biometric, materials, or compounds sensors, and a cover assembly. In one embodiment, the main assembly is configured to receive the smartphone, and to slide onto the cover assembly (encasement), thereby positioning the main assembly (such as supplemental circuitry as discussed herein) and the cover assembly against the smartphone to expose the one or more embedded biometric, materials, or compounds sensors for subsequent use. The main assembly (such as supplemental circuitry) and the cover assembly (such as protective encasement) of the smartphone companion device can be configured to form a so-called smart case for the mobile communication device.

These and other more specific embodiments are disclosed in more detail below.

Note that any of the supplemental circuitry or electronic circuitry as discussed herein can include one or more computerized devices, wireless interfaces, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or other a medium such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatuses, computer program products, computer-readable media, etc., that support operations as discussed herein.

One embodiment includes a computer readable storage media and/or a apparatus having instructions stored thereon to facilitate monitoring of matter under test. For example, in one embodiment, the instructions, when executed by computer processor hardware, cause the computer processor hardware (such as one or more processor devices) to: control an optical transmitter disposed in supplemental circuitry to illuminate matter under test, the supplemental circuitry and a mobile communication device are retained in an encasement; monitor attributes of an optical signal reflected off the matter under test and received by the optical receiver; and communicate the attributes of the optical signal from the supplemental circuitry to the mobile communication device over a communication link.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of enhancing use of a mobile communication device such as a smartphone or the like. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1A:
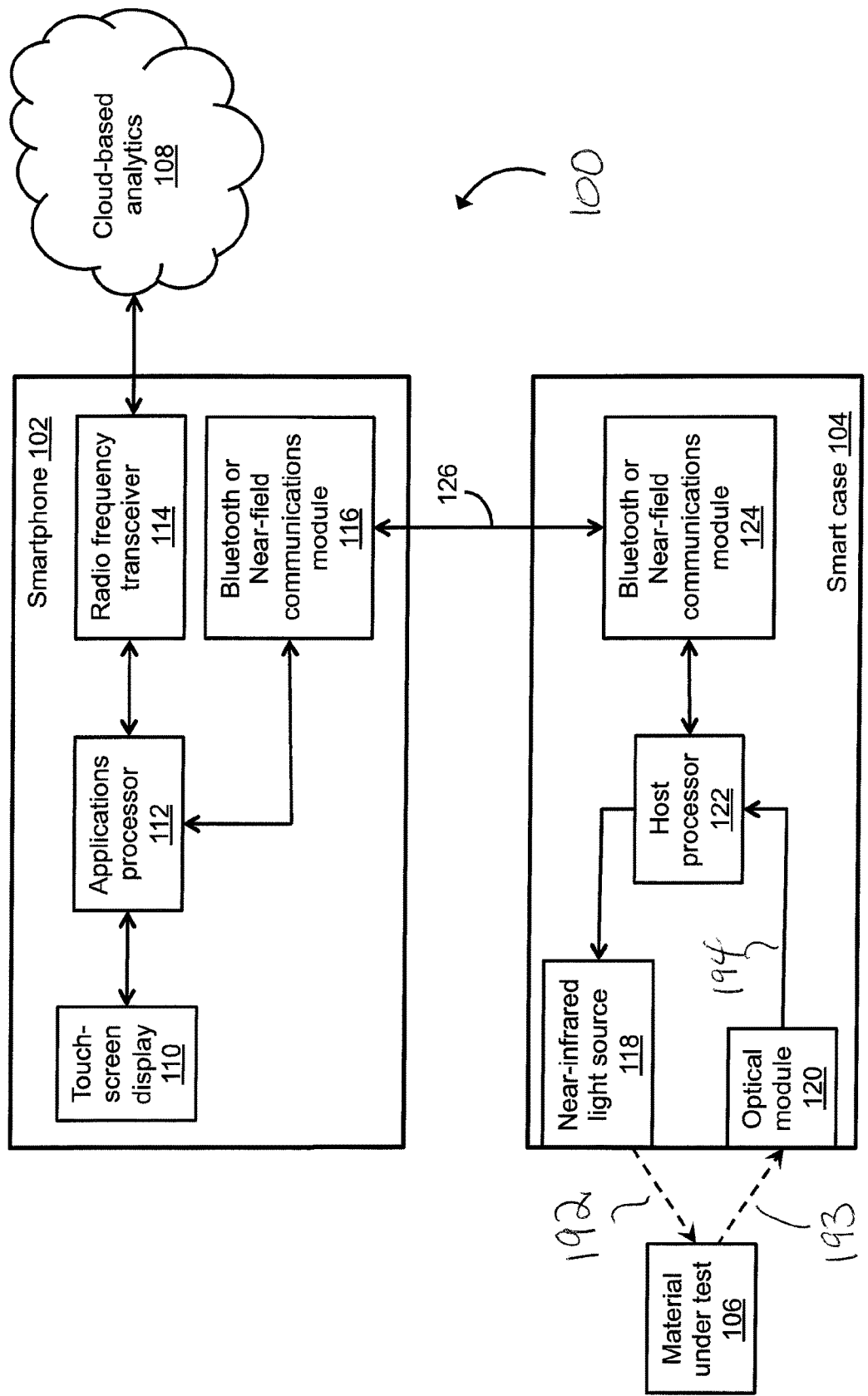
FIG. 1A is a block diagram of an example smart case (protective encasement and supplemental circuitry) and smartphone (mobile communication device) configured as a system for spectrometric materials sensing according to embodiments herein.

The foregoing and other objects, features, and advantages of the embodiments herein will be apparent from the following more particular description, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, an apparatuses, systems, methods, etc., enhance functionality of a mobile communication device. The apparatus includes an encasement (housing) in which to retain the mobile communication device and corresponding supplemental circuitry. The supplemental circuitry provides functionality not supported by the mobile communication device. For example, in one embodiment, the supplemental circuitry is operable to: i) control an optical transmitter in the supplemental circuitry to irradiate matter under test, ii) monitor attributes (wavelengths, wavelength intensity or amplitudes, etc.) of an optical signal reflected off the matter under test as detected by the optical receiver; and iii) communicate the attributes of the optical signal from the supplemental circuitry to the mobile communication device over a communication link.

Note that the supplemental circuitry as discussed herein optionally includes any suitable circuitry (such as control circuitry, analyzers, interfaces, sensors, etc.) to perform additional functions.

FIG. 1A depicts an illustrative embodiment of an exemplary smart case 104 and smartphone 102 configured as a system 100 for spectrometric materials sensing, in accordance with embodiments herein.

Figure 12A:
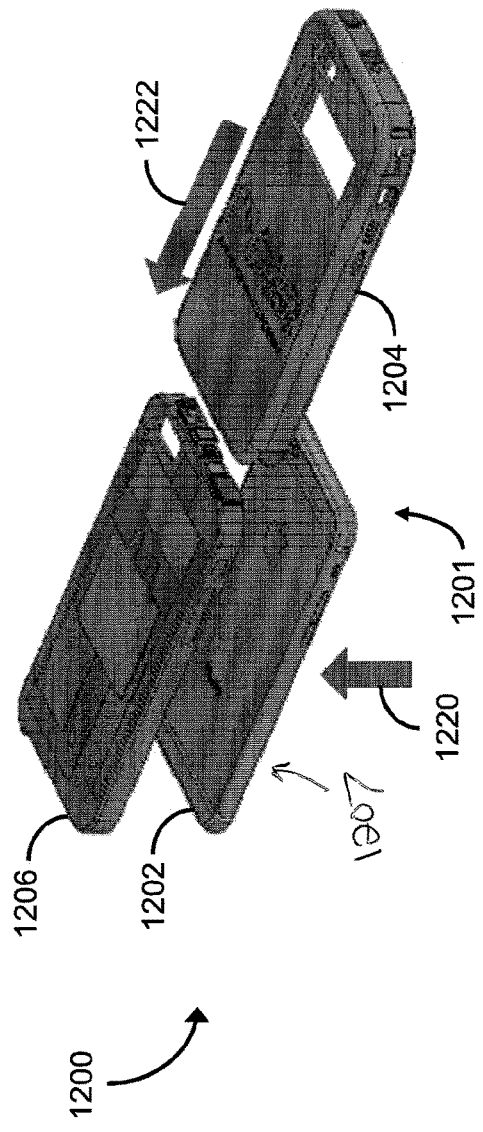
FIG. 12A is an example diagram illustrating how to combine a smart case and mobile communication device according to embodiments herein.
Figure 12B:
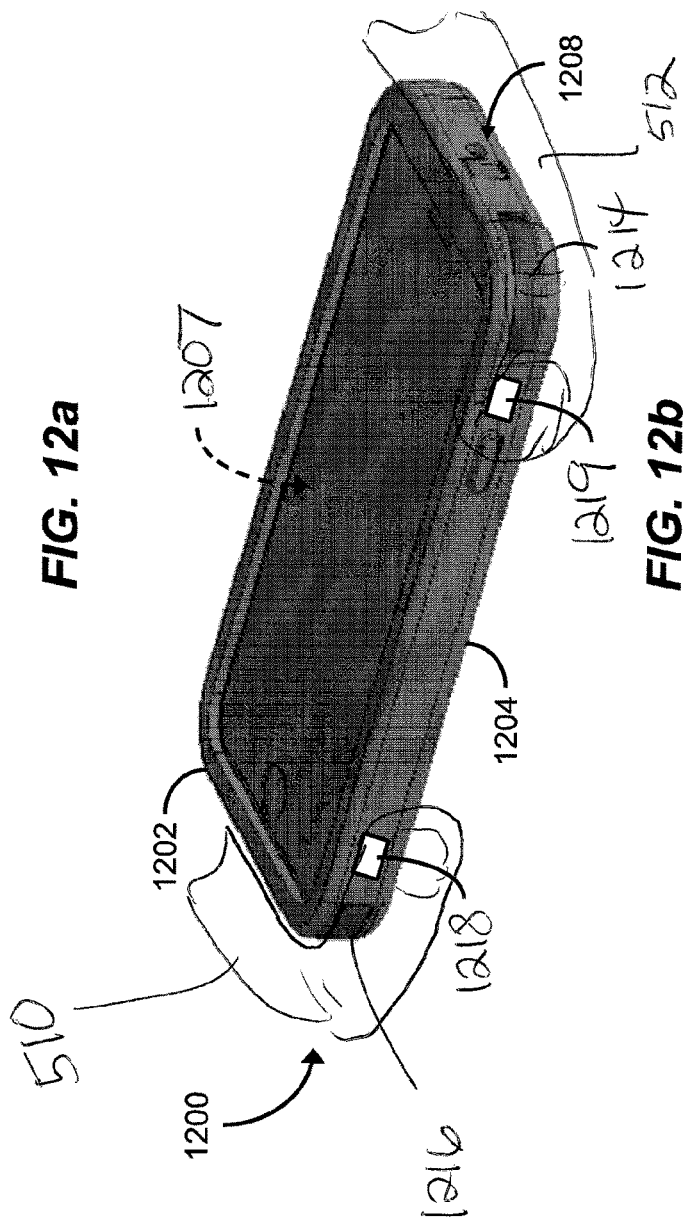
FIGS. 12B and 12C are perspective views of a combination smart case and mobile communication device according to embodiments herein.
Figure 12C:
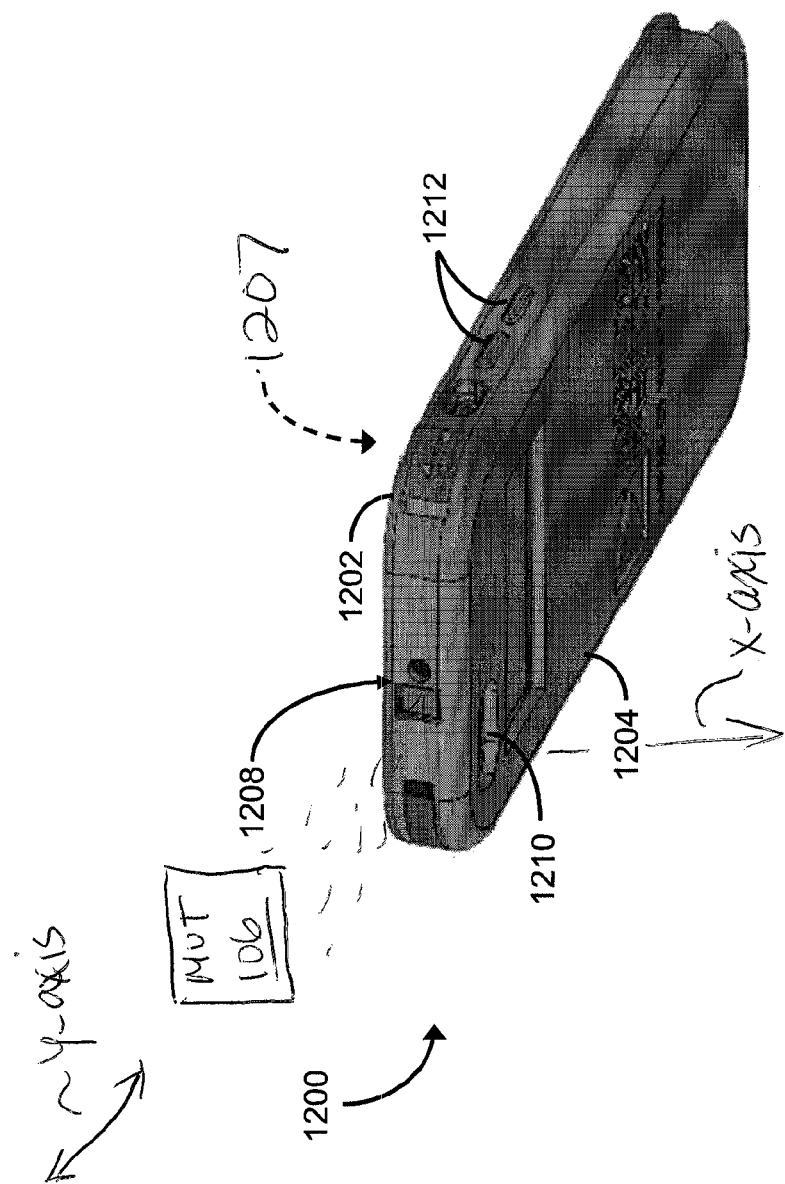

As shown in FIG. 1A, the smart case 104 includes a near-infrared (NIR) light source 118, an optical module 120, a host processor 122, and a Bluetooth or near-field communications (NFC) module 124. The optical module 120 can be configured to have an optics setup that includes Fourier optics, and an NIR photodiode or CMOS image sensor. For example, the NIR light source 118 and the optics setup may be located at the top edge of the smartphone 102 (see also reference numeral 1202; FIGS. 12A-12C) next to where a camera lens 1210 (see FIG. 12C) of the smartphone 102 is typically located, but rotated 90 degrees so that the NIR light source 118 and the optics setup (see also reference numeral 1208; FIGS. 12B and 12C) point out of the smartphone's top edge.

The host processor 122 of the smartcase 104 optionally includes a digital signal processor (DSP) for data reduction.

As further shown in FIG. 1A, the smartphone 102 includes a touchscreen display 110, an applications processor 112, a radio frequency (RF) transceiver 114, and a wireless interface such as Bluetooth or NFC module 116. The wireless interface such as RF transceiver 114 of the smartphone 102 optionally communicates with a network that includes cloud-based analytics 108 to perform processing functions.

The Bluetooth or NFC module 124 of the smart case 104 communicates with the Bluetooth or NFC module 116 of the smartphone 102 over a wireless data link 126 in accordance with any suitable communication protocol.

The system 100 for spectrometric materials sensing will be further understood with reference to the following illustrative example.

In this example, via touchscreen display 110 of the smartphone 102, assume that the respective user enters selection of a spectrometry application (also referred to herein as an "app") running on the applications processor 112. Having entered the spectrometry application, the smartphone 102 is operable to communicate with the smart case 104 over the wireless data link 126 to trigger, via control input 191) the NIR light source 118 for at least momentarily illuminating a material under test 106 with optical signal 192.

In one embodiment, the material under test 106 is a relatively homogenous material, although material under test 106 can be any suitable material, object, etc., of homogeneous or heterogeneous material.

The optical module 120 (optical receiver) detects reflected optical energy 193 from the material under test 106. Based on the reflected optical energy 193, the optical module 120 provides the signal 194 to the host processor 122. The host processor 122 performs a spectral analysis of the signal 194 to produce spectral results (spectral data or spectral information including amplitudes of different wavelengths of optical energy in the optical signal 193).

The host processor 122 communicates the spectral results of the spectral analysis over link 126 to an applications processor 112 executing on smartphone 102. The applications processor 112 optionally transmits, via the RF transceiver 114, the spectral results to the cloud-based analytics 108 in order to obtain classification and/or estimation information pertaining to the material under test 106.

The applications processor 112 receives, from the cloud-based analytics 108 via the RF transceiver 114, the classification and/or estimation information for the material under test 106, and provides a view of the classification of material type and/or estimation information to the user by way of the touchscreen display 110.

Figure 1B:
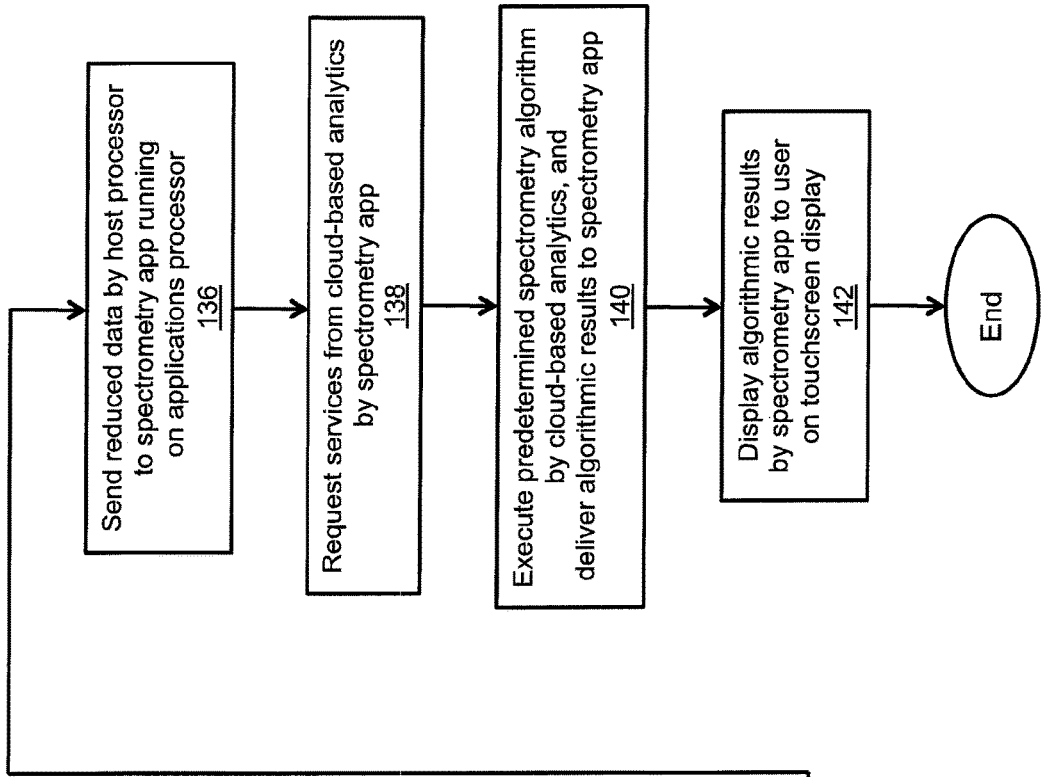
FIG. 1B is a flow diagram of an example method of operating the system of FIG. 1A according to embodiments herein.
Figure 1B:
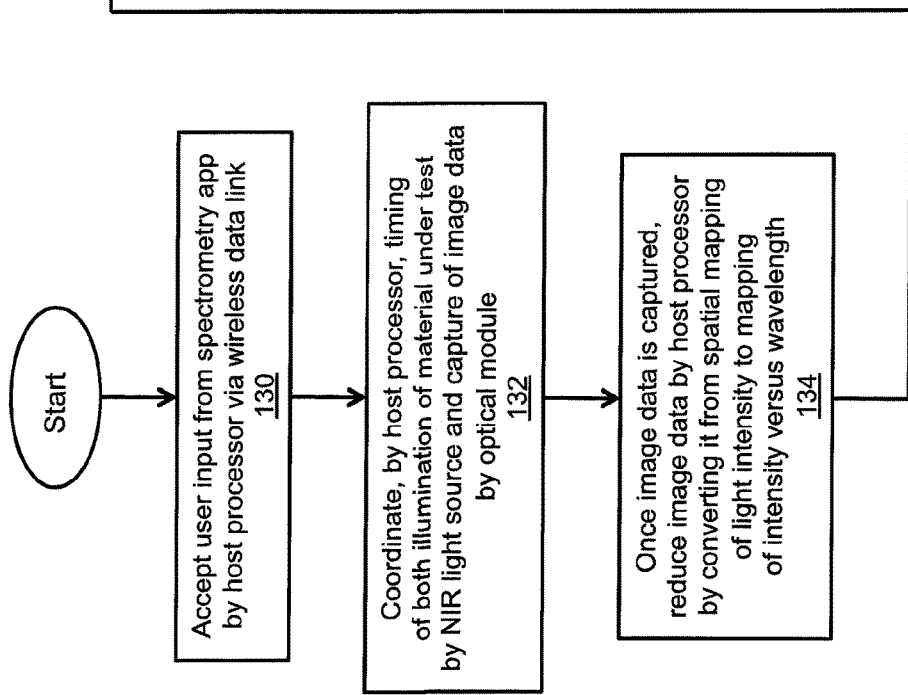

FIG. 1B is an example diagram illustrating a method of operating the system 100 for spectrometric materials sensing according to embodiments herein, As shown in block 130 (see FIG. 1B), user input from the spectrometry application is accepted by the host processor 122 via the wireless data link 126.

As depicted in block 132, the timing of both the illumination of the material under test 106 by the NIR light source 118 (optical transmitter) and the capture of image data (signal 194) by the optical module 120 (optical receiver) are coordinated by the host processor 122.

As depicted in block 134, once the image data is captured, the image data is reduced by the host processor 122 by converting it from a spatial mapping of light intensity to a mapping of optical intensity versus respective wavelength.

As depicted in block 136, the reduced data is sent by the host processor 122 over data link 126 to the spectrometry application running on the applications processor 112.

As depicted in block 138, services from the cloud-based analytics 108 are requested by the spectrometry application (executing on applications processor 112).

As depicted in block 140, a predetermined spectrometry algorithm is executed by the cloud-based analytics 108, and algorithmic results are delivered to the spectrometry application (executing on applications processor 112).

As depicted in block 142, the spectrometry application displays algorithmic results on the touchscreen display 110 for viewing by a respective user.

It is noted that the spectrometry application can enable a user to perform materials analysis on many different target materials, including, but not limited to, (1) perform an estimation of an amount of a detected substance such as caffeine in tea, coffee, or soda, (2) perform a non-destructive analysis of fruits and vegetables to determine their overall quality, (3) perform an estimation of the quality of water, alcohol, milk, etc., and (4) perform classification of alcoholic beverages by age, just to name a few examples.

As a more specific example, caffeine is a naturally occurring stimulant present in the seeds and leaves of many different plants. Tea, coffee, and soda are generally the most common sources of caffeine in almost everyone's day-to-day life. However, the consumption of caffeine in an excess amount can have an adverse effect on health. Typically, about 400 milligrams of caffeine consumption per day is generally considered to be safe for most people.

A traditional way of estimating the amount of caffeine in tea, coffee, or soda is through chemical analysis, which can include the use of expensive high-end instruments for performing high performance liquid chromatography (HPLC), ultraviolet (UV/VIS) spectrometry, etc. However, such chemical analysis typically requires a skilled user with expertise in chemistry, as well as state-of-the-art chemical laboratories. There does not appear to be any low cost solutions, processes, and/or instruments currently available in the marketplace that allow reliable, fast, and accurate analysis of beverages (such as tea, coffee, soda, etc.).

The system 100 for spectrometric materials sensing can satisfy this need. For example, using the system 100, the amount of caffeine in a beverage such as tea, coffee, or soda can be estimated in as few as three steps, including (1) scanning the beverage (see FIG. 1C), (2) capturing light (reflected optical signal 193) reflected from or passing through the beverage (see FIG. 1D), and (3) displaying the estimated amount of caffeine in the beverage (e.g., 126.9 milligrams) on the touchscreen display (see FIG. 1E).

With regard to the non-destructive analysis of fruits and vegetables, the taste and cost of such fruits and vegetables generally depend on their quality, which, in turn, generally depends on their chemical compositions. For example, the quality of a tomato may depend upon certain parameters such as its glucose level, fructose level, pH value, acidity level, conductivity, etc. Traditionally, the values of such parameters have been estimated by employing various instruments and/or devices such as pH meters, conductivity meters, refractometers, etc. However, such traditional approaches are typically destructive to fruits and vegetables, rendering them unavailable for reuse and/or sale. Such traditional approaches can also be time consuming and laborious to implement. The system 100 for spectrometric materials sensing provides easy, fast, and non-destructive analysis of fruits and vegetables in order to determine their chemical compositions, as well as their quality.

Figure 1F:
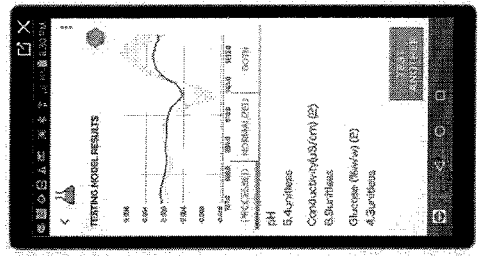
FIG. 1F is an example diagram illustrating display of parameters indicating attributes and/or quality of the substance under test according to embodiments herein.
Figure 1D:
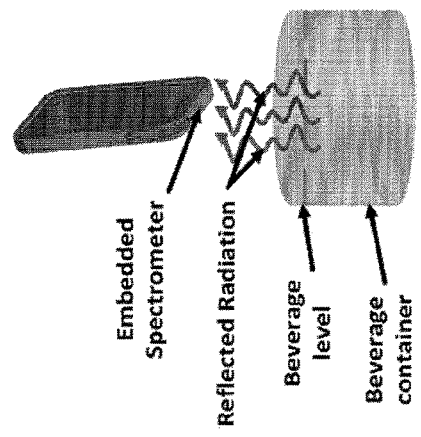
FIG. 1D is an example diagram illustrating detection of reflected optical signals according to embodiments herein.
Figure 1E:
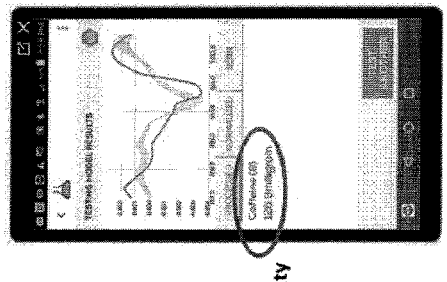
FIG. 1E is an example diagram illustrating display of parameters indicating attributes and/or quality of the substance under test according to embodiments herein.
Figure 1C:
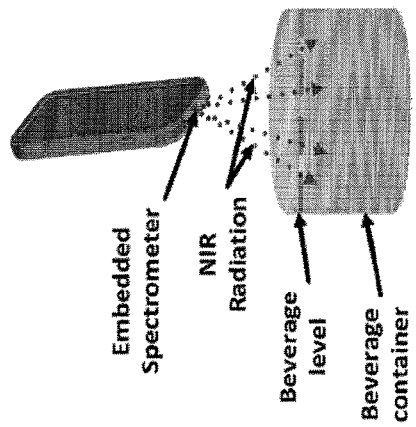
FIG. 1C is an example diagram illustrating irradiation of a substance according to embodiments herein.

For example, using the system 100, the quality of a fruit or vegetable can be determined in as few as four steps, including (1) irradiating the fruit or vegetable sample with NIR radiation from near infrared light source 118, (2) collecting the reflected spectral signature of the fruit or vegetable sample the analysis of the optical signal 193 as sensed by the optical module 120, (3) sending the spectral signature to cloud-based analytics for processing, and (4) displaying the processing results (e.g., pH value, conductivity, glucose level, etc.) to the user on the touchscreen display (see FIG. 1F).

Figure 2A:
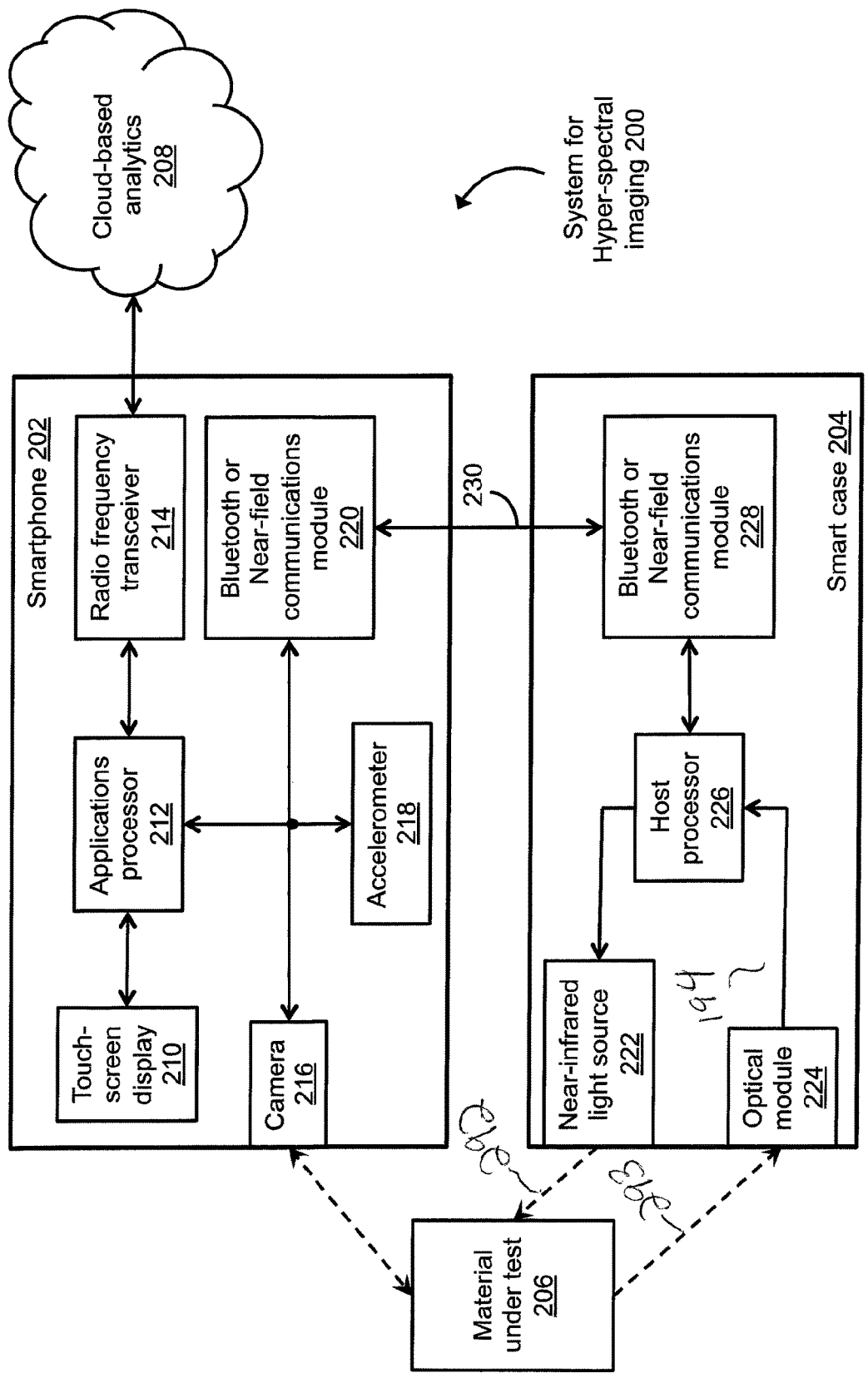
FIG. 2A is a block diagram of a combination smart case and mobile communication device configured as a system for hyper-spectral imaging according to embodiments herein.

FIG. 2A depicts an illustrative embodiment of an exemplary smart case 204 and smartphone 202 configured as a system 200 for hyper-spectral imaging, in accordance with the present application.

As shown in FIG. 2A, the smart case 204 includes an NIR light source 222 (optical transmitter), an optical module 224 (an optical receiver/sensor), a host processor 226, and a Bluetooth or NFC module 228 (i.e., any suitable wireless interface).

The optical module 224 can include an optics setup that includes Fourier optics, and an NIR photodiode or CMOS image sensor. Further, the host processor 226 can include a DSP for data reduction purposes.

The smartphone 202 includes a touchscreen display 210, an applications processor 212, an RF transceiver 214, a camera 216, an accelerometer 218, and a Bluetooth or NFC module 220. The RF transceiver 214 of the smartphone 202 communicates with a network that includes cloud-based analytics 208. The Bluetooth or NFC module 228 of the smart case 204 communicates with the Bluetooth or NFC module 220 of the smartphone 202 over a wireless data link 230.

The system 200 for hyper-spectral imaging will be further understood with reference to the following illustrative example.

In this example, a user of the system 200 operates the touchscreen display 210 of the smartphone 202 by selecting a hyper-spectral imaging application for execution on the applications processor 212. Having entered the hyper-spectral imaging application, the smartphone 202 (mobile communication device) communicates with the electronic circuitry in smart case 204 over the wireless data link 230 to trigger the NIR light source 222 for momentarily illuminating a material under test 206 with optical signal 292, which, in this case, need not be a homogenous material.

Light (optical signal 293) reflected from or through the illuminated material under test 206 is then be received at the optical module 224, which provides a signal 194 to the host processor 226 for use in determining a spectral content associated with the material under test 206. Having determined the spectral content associated with the material under test 206, the host processor 226 provides corresponding spectral data (derived from the analysis of signal 194) to the applications processor 212 over the wireless data link 230.

In one embodiment, the applications processor 212 additionally controls the camera 216 in order to obtain a visual image of the material under test 206, as well as control the accelerometer 218 to obtain information pertaining to the orientation of the smartphone 202 relative to the material under test 206.

The applications processor 212 transmits, via the RF transceiver 214, the spectral data, visual image data, and orientation data to the cloud-based analytics 108 in order to obtain a measurement(s) of the volume(s) of one or more compounds contained in the material under test 206. The applications processor 212 then receives, from the cloud-based analytics 208 via the RF transceiver 214, the compound volume measurement(s) for the material under test 206, and provides the compound volume measurement(s) to the user by way of the touchscreen display 210. For example, such compound volume measurements for the material under test 206 can be used to determine the total amount of calories on a plate of food, the ripeness and/or freshness of fruits and/or vegetables, etc.

Figure 2B:
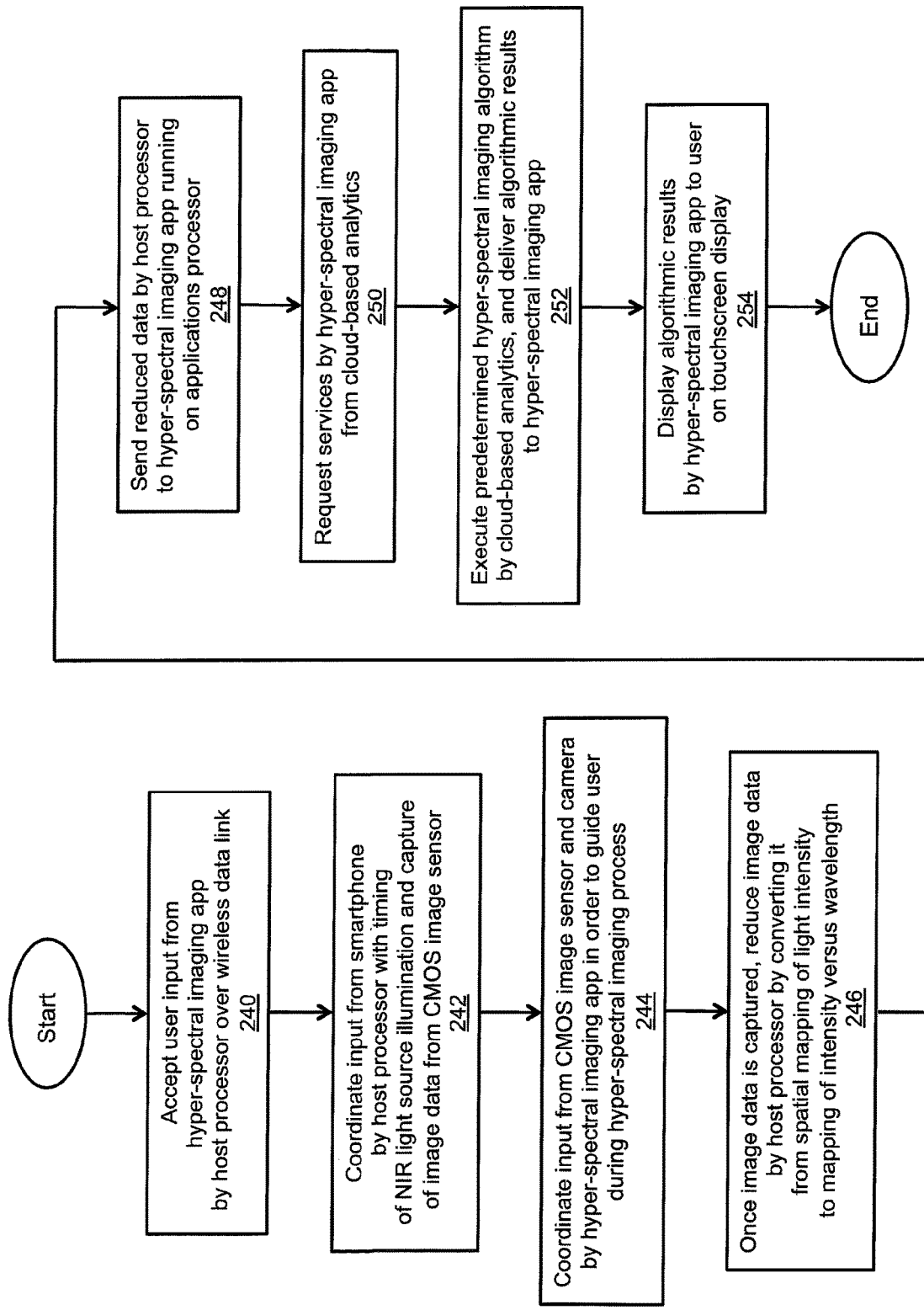
FIG. 2B is an example diagram illustrating a method of operating the system of FIG. 2A according to embodiments herein.

FIG. 2B is an example diagram illustrating a method of operating the system 200 for hyper-spectral imaging according to embodiments herein. Note that the system 200 can be employed to build a 3-dimensional model of a scanned material under test with spectral absorption information collected at discrete points over the material's surface.

As depicted in block 240 (see FIG. 2B), user input is accepted from the hyper-spectral imaging application by the host processor 226 over the wireless data link 230. As depicted in block 242, input from the smartphone 202 is coordinated, by the host processor 226, with the timing of the NIR light source 222 illumination and the capture of image data from the CMOS image sensor (optical module 224).

As depicted in block 244, input from the CMOS image sensor and the camera 216 are coordinated by the hyper-spectral imaging application (applications processor 212) in order to guide a user during the hyper-spectral imaging process.

As depicted in block 246, once the image data is captured for signal 194, the respective image data is reduced by the host processor 226 by converting it from a spatial mapping of light intensity to a mapping of intensity versus wavelength.

As depicted in block 248, the set of reduced data is sent by the host processor 226 to the hyper-spectral imaging application running on the applications processor 212.

As depicted in block 250, services are requested by the hyper-spectral imaging application from the cloud-based analytics 208.

As depicted in block 252, a predetermined hyper-spectral imaging algorithm is executed by the cloud-based analytics 208, and algorithmic results are delivered to the hyper-spectral imaging application.

As depicted in block 254, the algorithmic results are displayed by the hyper-spectral imaging application on the touchscreen display 210 to a respective user.

In certain embodiments, the hyper-spectral imaging application running on the smartphone 202 one or more of the following functions: (1) display the image from the camera 216 while the scanning is in progress to guide a user in properly scanning the material under test 206, (2) append a time stamp and location to the algorithmic results to create a measurement record, (3) provide an application programming interface (API) to the measurement record for other applications to aggregate dietary and/or medication information in order to provide a correlation analysis, (4) display the calorie count of a scanned meal along with daily calorie totals, (5) log the data record to cloud storage where it can be accessed by authorized third parties, and (6) provide the user with feedback to encourage healthy eating.

Figure 3A:
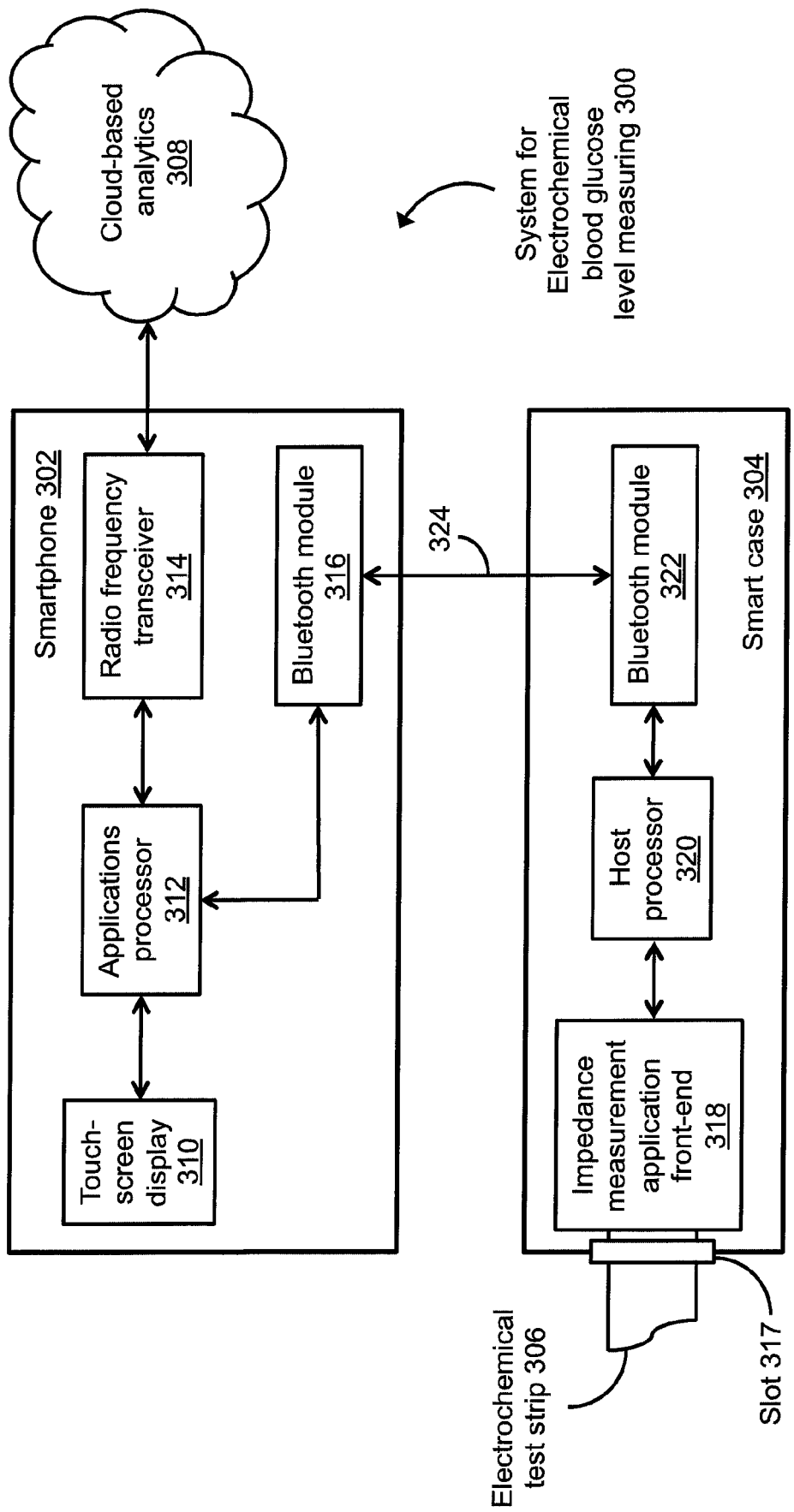
FIG. 3A is an example diagram illustrating a combination smart case and mobile communication device operable to electrochemically measure a blood glucose level according to embodiments herein.

FIG. 3A is an illustrative embodiment of an exemplary smart case 304 and smartphone 302 configured as a system 300 for electrochemical blood glucose level measuring, in accordance with the present application.

As shown in FIG. 3A, the smart case 304 includes an impedance measurement application front-end (AFE) 318, a host processor 320, and a Bluetooth module 322. The smartphone 302 includes a touchscreen display 310, an applications processor 312, an RF transceiver 314, and a Bluetooth module 316. The RF transceiver 314 of the smartphone 302 communicates with a network that includes cloud-based analytics 308. The Bluetooth module 322 of the smart case 304 communicates with the Bluetooth module 316 of the smartphone 302 over a wireless data link 324.

The system 300 for electrochemical blood glucose level measuring will be further understood with reference to the following illustrative example. In this example, a user of the system 300 can employ the touchscreen display 310 of the smartphone 302 to select an application to execute on the applications processor 312 for measuring an electrochemical blood glucose level.

Having entered the application for measuring the electrochemical blood glucose level, the user can place a drop of his or her blood onto an electrochemical test strip 306, such as a blood glucose test strip, and insert the blood glucose test strip 306 with the drop of blood placed upon it into a slot 317 in the smart case 304.

The impedance measurement application front end 318 (circuit) receives the blood glucose test strip 306 for testing, measures an electrical (i.e., impedance) response produced on the blood glucose test strip 306, and provides impedance response information (impedance data) over wireless data link 324 to the host processor 320.

The host processor 320 then provides, over the wireless data link 324, impedance data to the applications processor 312, which transmits, via the RF transceiver 314, the impedance data to the cloud-based analytics 308 in order to obtain the user's blood glucose level.

The applications processor 312 then receives, via the RF transceiver 314, a measurement of a user's blood glucose level from the cloud-based analytics 308, and provides the blood glucose level to the user by way of the touchscreen display 310.

Figure 3B:
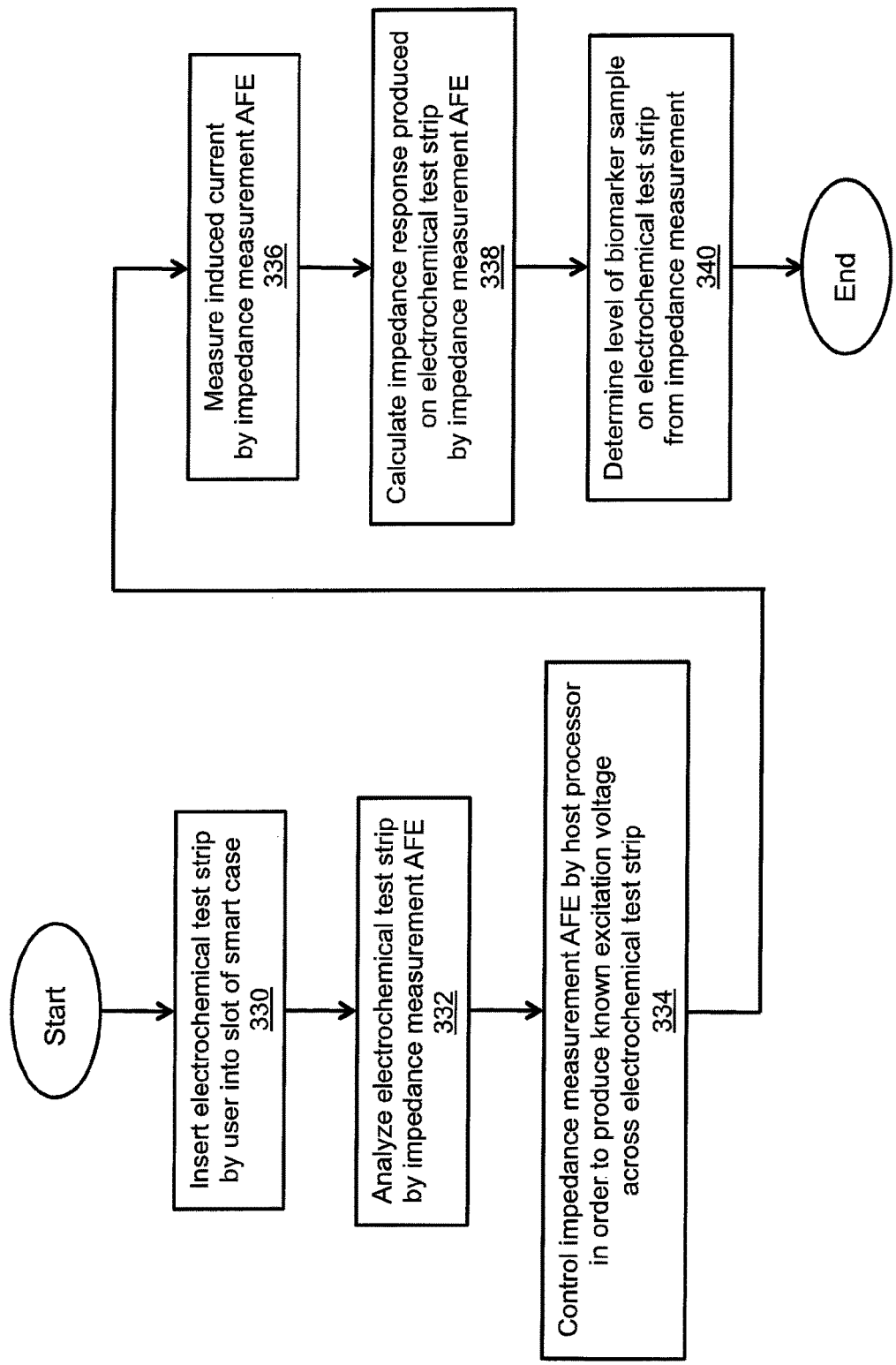
FIG. 3B is an example diagram illustrating a method of operating the system of FIG. 3A according to embodiments herein.

A method of operating the system 300 for electrochemical blood glucose level measuring is described herein with reference to FIG. 3B.

As depicted in block 330 (see FIG. 3B), the electrochemical test strip 306 is inserted by a user into the slot 317 (see FIG. 3A) of the smart case 304.

As depicted in block 332, the electrochemical test strip 306 is analyzed by the impedance measurement application front end 318 by performing a 4-wire DC or AC impedance measurement.

As depicted in block 334, the impedance measurement application front-end 318 is controlled by the host processor 320 in order to produce a known excitation voltage across the electrochemical test strip 306.

As depicted in block 336, the application front end 318 measures an induced current through the electrochemical test strip 306.

As depicted in block 338, the impedance measurement application front-end 318 calculates an impedance measurement based on the electrochemical test strip 306.

As depicted in block 340, a level of a biomarker sample on the electrochemical test strip 306 is determined from the impedance measurement.

In certain embodiments, the application for measuring the electrochemical blood glucose level running on the smartphone 302 can perform at least the following functions: (1) provide reminders to a user to take certain measurements based on a schedule determined by the user, (2) alert the user in the event the system 300 requires calibration or is ready for use, (3) prompt the user to insert the electrochemical test strip 306, and provide feedback to the user regarding whether or not a measurement was successful, (4) append a time stamp and location to the measurement to create a measurement record, (5) provide an application programming interface (API) to the measurement record for applications to aggregate dietary and/or medication information in order to provide a correlation analysis, (6) display current and historical measurement results, (7) log the data record to cloud storage where it can be accessed by authorized third parties, (8) provide the user with feedback to enhance adherence to condition monitoring and treatment protocols, and (9) provide the user with alerts to perform actions steps, as required.

Figure 4A:
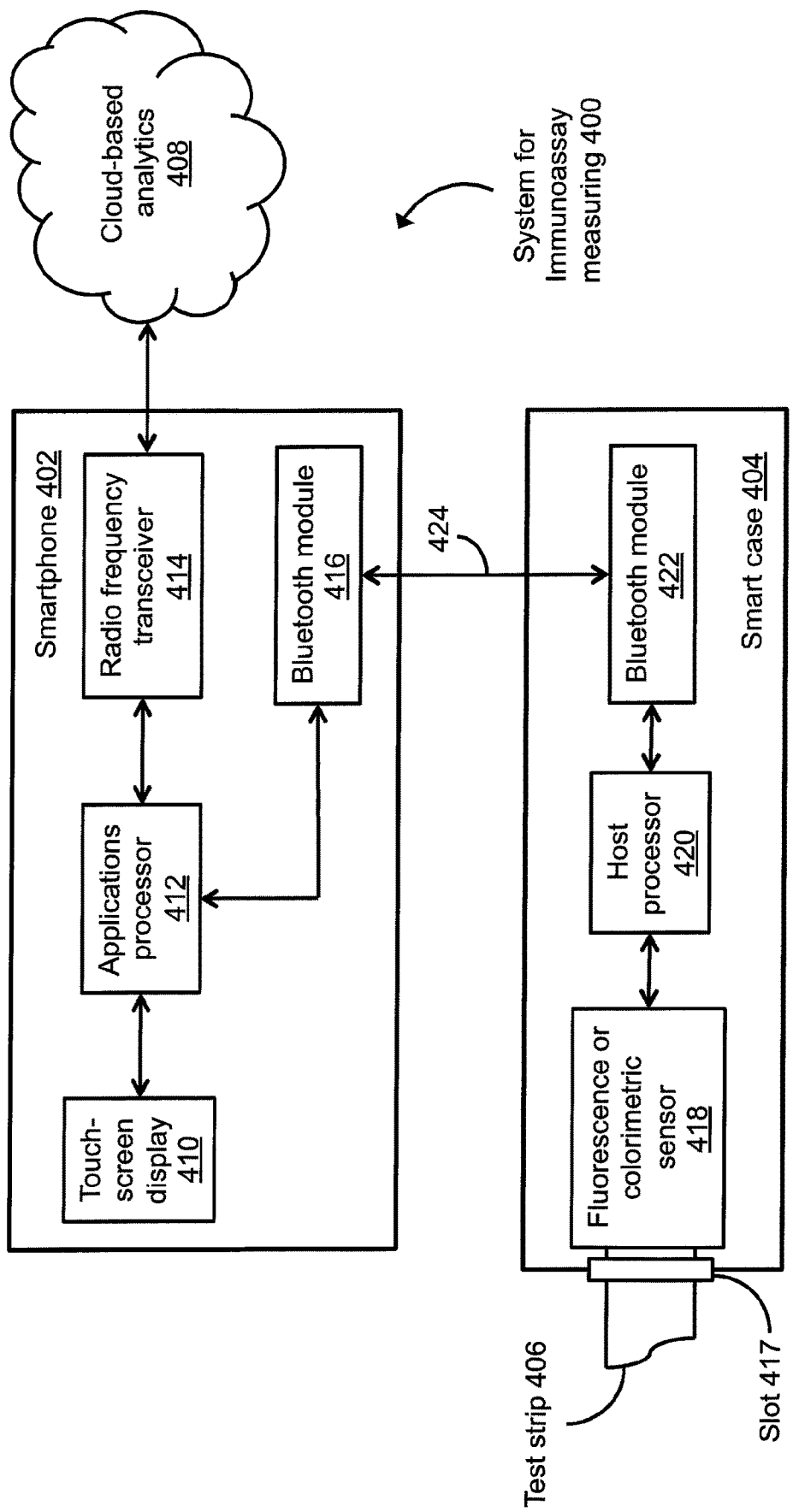
FIG. 4A is an example diagram illustrating a combination smart case and mobile communication device operable to provide immunoassay measuring and analysis according to embodiments herein.

FIG. 4A depicts an illustrative embodiment of an exemplary smart case 404 and smartphone 402 configured as a system 400 for immunoassay measuring, in accordance with the present application.

As shown in FIG. 4A, the smart case 404 includes a fluorescence or colorimetric sensor 418, a host processor 420, and a Bluetooth module 422. The smartphone 402 includes a touchscreen display 410, an applications processor 412, an RF transceiver 414, and a Bluetooth module 416.

The RF transceiver 414 of the smartphone 402 communicates with a network that includes cloud-based analytics 408. The Bluetooth module 422 of the smart case 404 communicates with the Bluetooth module 416 of the smartphone 402 over a wireless data link 424.

The system 400 for immunoassay measuring will be further understood with reference to the following illustrative example.

In this example, a user of the system 400 can employ the touchscreen display 410 of the smartphone 402 to enter selection of an application for execution on the applications processor 412 for making an immunoassay measurement.

Having entered the application for making the immunoassay measurement, the user place matter under test such as a drop of her urine upon a test strip 406, such as a pregnancy test strip, and inserts the pregnancy test strip 406 with the drop of urine placed upon it into a slot 417 in the smart case 404. The fluorescence or colorimetric sensor 418 receive the pregnancy test strip 406, and measures an optical (i.e., fluorescent) response produced on the pregnancy test strip 406. For example, the user's urine on the pregnancy test strip 406 may contain human chorionic gonadotropin (hCG), which is a hormone that is secreted in a woman's urine during pregnancy. Further, the hCG hormone contained in the user's urine may react with antibodies provided on the pregnancy test strip 406, thereby changing the test strip's fluorescence characteristics. The fluorescence or colorimetric sensor 418 provides the fluorescent response information to the host processor 420. The host processor 420 then provides, over the wireless data link 424, fluorescent response data to the applications processor 412, which transmits, via the RF transceiver 414, the fluorescent response data to the cloud-based analytics 408 in order to obtain an indication of a possible pregnancy condition of the user.

The applications processor 412 then receives, via the RF transceiver 414, the indication of the user's possible pregnancy condition from the cloud-based analytics 408, and provides the indication of the possible pregnancy condition to the user by way of the touchscreen display 410.

Figure 4B:
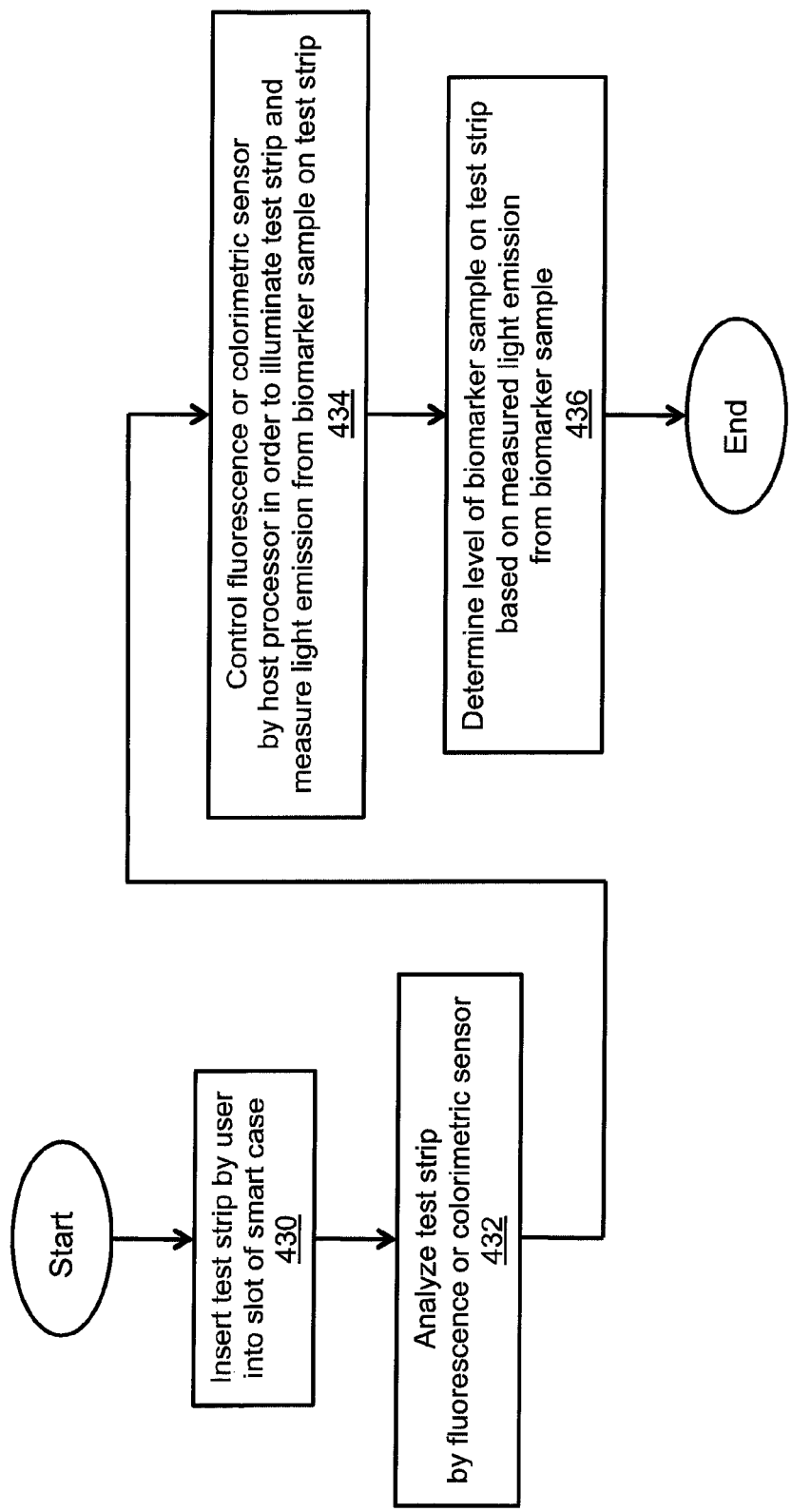
FIG. 4B is an example diagram illustrating a method of operating the system of FIG. 4A according to embodiments herein.

A method of operating the system 400 for immunoassay measuring is described herein with reference to FIG. 4B.

As depicted in block 430 (see FIG. 4B), the test strip 406 is inserted by a user into the slot 417 of the smart case 404.

As depicted in block 432, the test strip 406 is analyzed by the fluorescence or colorimetric sensor 418.

As depicted in block 434, the fluorescence or colorimetric sensor 418 is controlled, by the host processor 420, in order to illuminate the test strip 406 and measure an emission of light from a biomarker sample on the test strip 406.

As depicted in block 436, a level of the biomarker sample on the test strip 406 is determined based on the measured light emission from the biomarker sample.

In certain embodiments, the application for making the immunoassay measurement running on the smartphone 402 performs one or more of the following functions such as: (1) providing reminders to a user to take measurements based on a user determined schedule, (2) alerting the user in the event the system 400 requires calibration or is ready for use, (3) prompting the user to insert the test strip 406, and provide feedback to the user regarding whether or not the measurement was successful, (4) appending a time stamp and location to the measurement to create a measurement record, (5) providing an applications programming interface (API) to the measurement record for other applications to aggregate dietary and/or medication information in order to provide a correlation analysis, (6) display current and historical measurement results, (7) logging the data record to cloud storage where it can be accessed by authorized third parties, (8) providing the user with feedback to enhance adherence to condition monitoring and treatment protocols, and (9) providing the user with alerts to perform actions steps, as required.

Figure 5A:
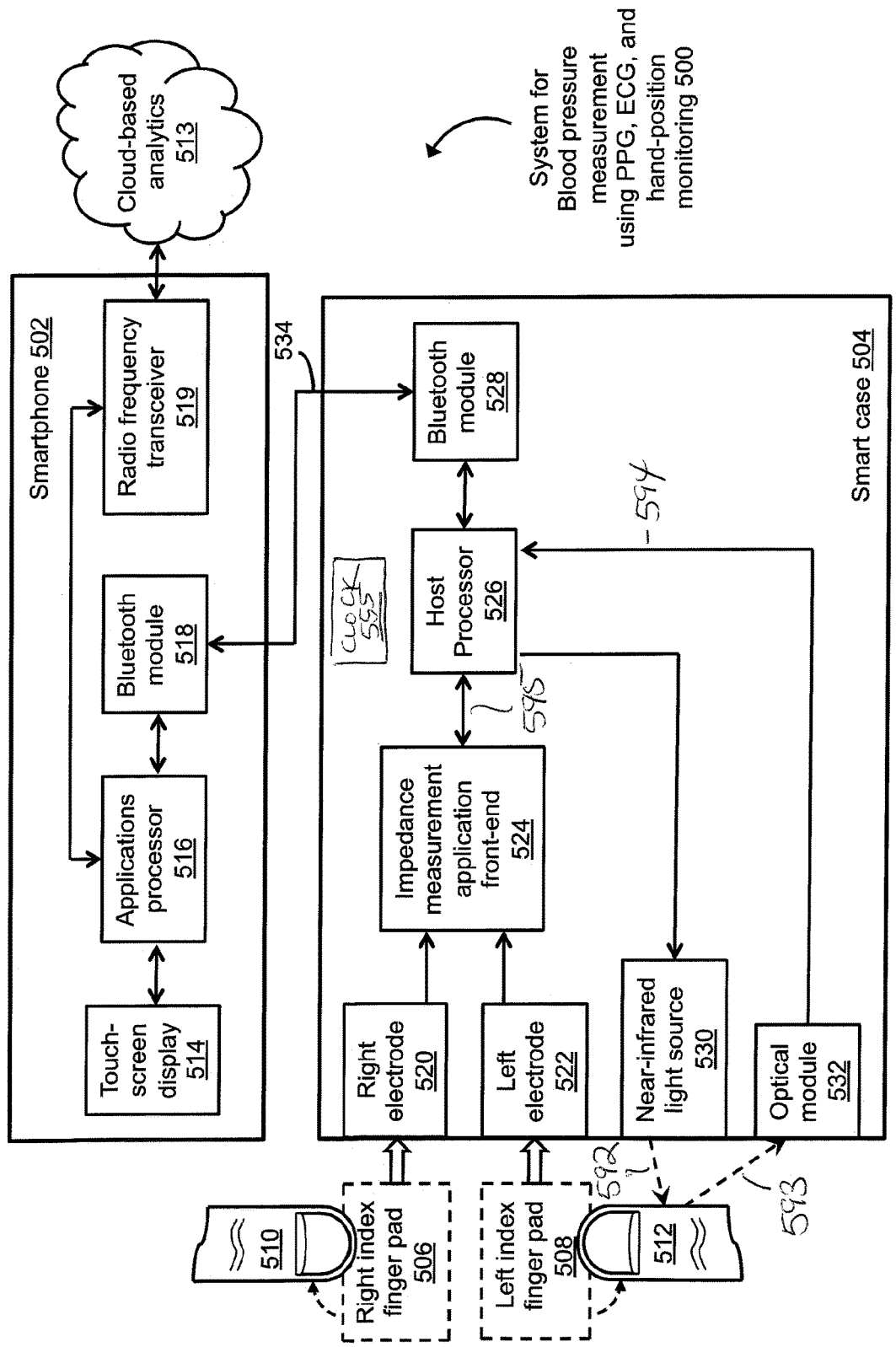
FIG. 5A is an example diagram illustrating a combination smart case and mobile communication device operable to monitor photoplethysmography (PPG) and electrocardiography (ECG) metrics according to embodiments herein.

FIG. 5A depicts an illustrative embodiment of an exemplary smart case 504 and smartphone 502 configured as a system 500 for enabling blood pressure measurement using photoplethysmography (PPG), electrocardiography (ECG), and hand-position monitoring, according to embodiments herein.

As shown in FIG. 5A, the smart case 504 includes a first ("right") electrode 520, a second ("left") electrode 522, an impedance measurement application front end 524, an NIR light source 530 (optical transmitter), an optical module 532 (optical receiver), a host processor 526, and a Bluetooth module 528 (i.e., any wireless interface).

The optical module 532 can include Fourier optics, as well as an NIR photodiode. Further, the host processor 526 can include a DSP for data reduction.

The smartphone 502 includes a touchscreen display 514, an applications processor 516, an RF transceiver 519, and a Bluetooth module 518.

The RF transceiver 519 of the smartphone 502 communicates with a network that includes cloud-based analytics 513. The Bluetooth module 528 of the smart case 504 communicates with the Bluetooth module 518 of the smartphone 502 over a wireless data link 534.

The system 500 for enabling blood pressure measurement will be further understood with reference to the following illustrative example. In this example, a user of the system 500 uses the touchscreen display 514 of the smartphone 502 to enter selection of an application to execute on the applications processor 516 for making a blood pressure measurement using PPG, ECG, and hand-position monitoring. Having entered the application for making the blood pressure measurement, the user holds the smart case 504 so that (1) the pad 506 (region of finger by 510, see FIG. 5A) of his or her right index finger 510 is in contact with the right electrode 520, and (2) the pad 508 (see FIG. 5A) of his or her left index finger 512 is positioned over the NIR light source 530 and the optical module 532, and is in contact with the left electrode 522.

The impedance measurement application front and 524 generates and applies a differential voltage across the right electrode 520 in the left electrode 522. The impedance measurement application front end 524 then measures the amount of current passing through the finger 510 to the body of the user to the finger 512 to determine an impedance across the right electrode 520 in the left electrode 522.

Additionally, note that the application executing on the smartphone 502 communicates with the smart case 504 over the wireless data link 534 to cause the NIR light source 530 to transmit light (optical signal 592) to the bio media under test (finger 512). A portion of the optical signal 592 (namely, optical signal 593) reflects off the bio media under test back to the optical module 532 (optical receiver). The optical module 532 then provides a first signal 594 to the host processor 526 for use in acquiring PPG time series data of a spectrum of the light received at the optical module 532. The host processor 526 provide the PPG time series data to the applications processor 516 over the wireless data link 534. Clock 555 is available to produce the PPG time series data.

Essentially, simultaneously with the acquisition of the PPG time series data via irradiating the finger 512 with optical signal 592, the right and left electrodes 520, 522 operate in concert with the impedance measurement application front end 524 to provide a second signal 595 to the host processor 526 for use in obtaining ECG time series data. The host processor 526 provides the ECG time series data to the applications processor 516 over the wireless data link 534. Clock 555 is available to produce the ECG time series data.

Having received the PPG time series data and the ECG time series data, the applications processor 516 transmits, via the RF transceiver 519, a combination PPG/ECG time series data set to the cloud-based analytics 513 in order to obtain an indication of the user's blood pressure. The applications processor 516 then receives, via the RF transceiver 519, the indication of the user's blood pressure from the cloud-based analytics 513, and provides the indication of the blood pressure to the user by way of the touchscreen display 514.

As previously discussed, the supplemental circuitry in Smart case 504 optionally includes a first electrode 520 and a second electrode 522 in communication with or monitored by the supplemental circuitry such as impedance measurement application front-end 524 and host processor 526. As previously discussed, further embodiments herein include clock 555 disposed in the supplemental circuitry of the smart case 504 to track time for respective optical and measurements.

In one embodiment, the host processor 526 (computer processor hardware and corresponding software instructions) uses the clock to track timing attributes of an optical signal 593 detected by the optical receiver (optical module 532) and timing attributes of an impedance signal 595 detected across the first electrode 520 and second electrode 522. Inclusion of the timing attributes of the spectral information (obtained from monitoring the optical receiver for multiple optical receivers) and the timing attributes of the detected impedance enable the application executing on the mobile communication device to generate the blood pressure metric of a user holding the combination of smart case 504 and smart phone 502.

Figure 5B:
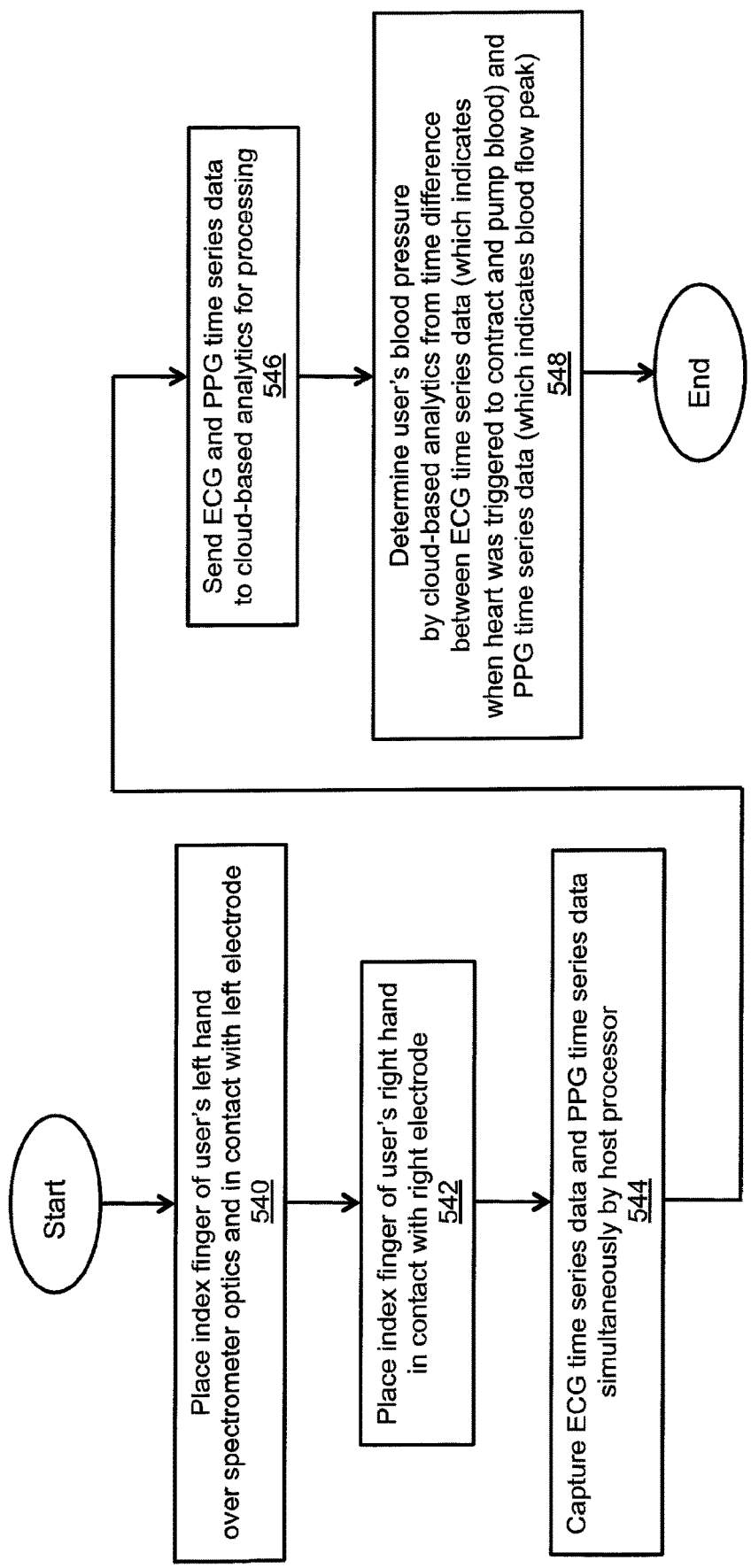
FIG. 5B is an example diagram illustrating a method of operating the system of FIG. 5A according to embodiments herein.

A method of operating the system 500 for enabling blood pressure measurement is described herein with reference to FIG. 5B.

As depicted in block 540 (see FIG. 5B), the index finger 512 of a user's left hand is placed over the spectrometer optics (including the NIR light source 530 and the optical module 532) and is in contact with the electrode 522.

As depicted in block 542, the index finger 510 of the user's right hand is placed in contact with the electrode 520.

As depicted in block 544, ECG time series data and PPG time series data are captured essentially simultaneously by the host processor 526 via signals 594 and 595.

As depicted in block 546, the ECG and PPG time series data are sent to the cloud-based analytics 513 for processing.

As depicted in block 548, the user's blood pressure is determined, by the cloud-based analytics 513, based on the time difference between the ECG time series data (which indicates when the heart was triggered to contract and pump blood) and the PPG time series data (which indicates the blood flow peak).

In certain embodiments, the application (executing on the applications processor 516) for making the blood pressure measurement running on the smartphone 502 can perform at least the following functions: (1) provide reminders on display 514 to a user to take measurements based on a user determined schedule, (2) the display 514, alert the user in the event the system 500 requires calibration or is ready for use, (3) provide feedback on display 514 to the user to assure that his or her hand is in the correct position for measurement, (4) provide a real time display of ECG and PPG waveforms versus time on display 514, (5) append a time stamp and location to the measurement to create a measurement record, (6) provide an applications programming interface (API) to the measurement record for other applications to aggregate dietary and/or medication information in order to provide a correlation analysis, (7) on display 514, display current and historical blood pressure measurement results, (8) log the data record to cloud storage where it can be accessed by authorized third parties, (9) provide the user with feedback to enhance adherence to condition monitoring and treatment protocols, and (10) provide the user with alerts to perform actions steps, as required.

Figure 6A:
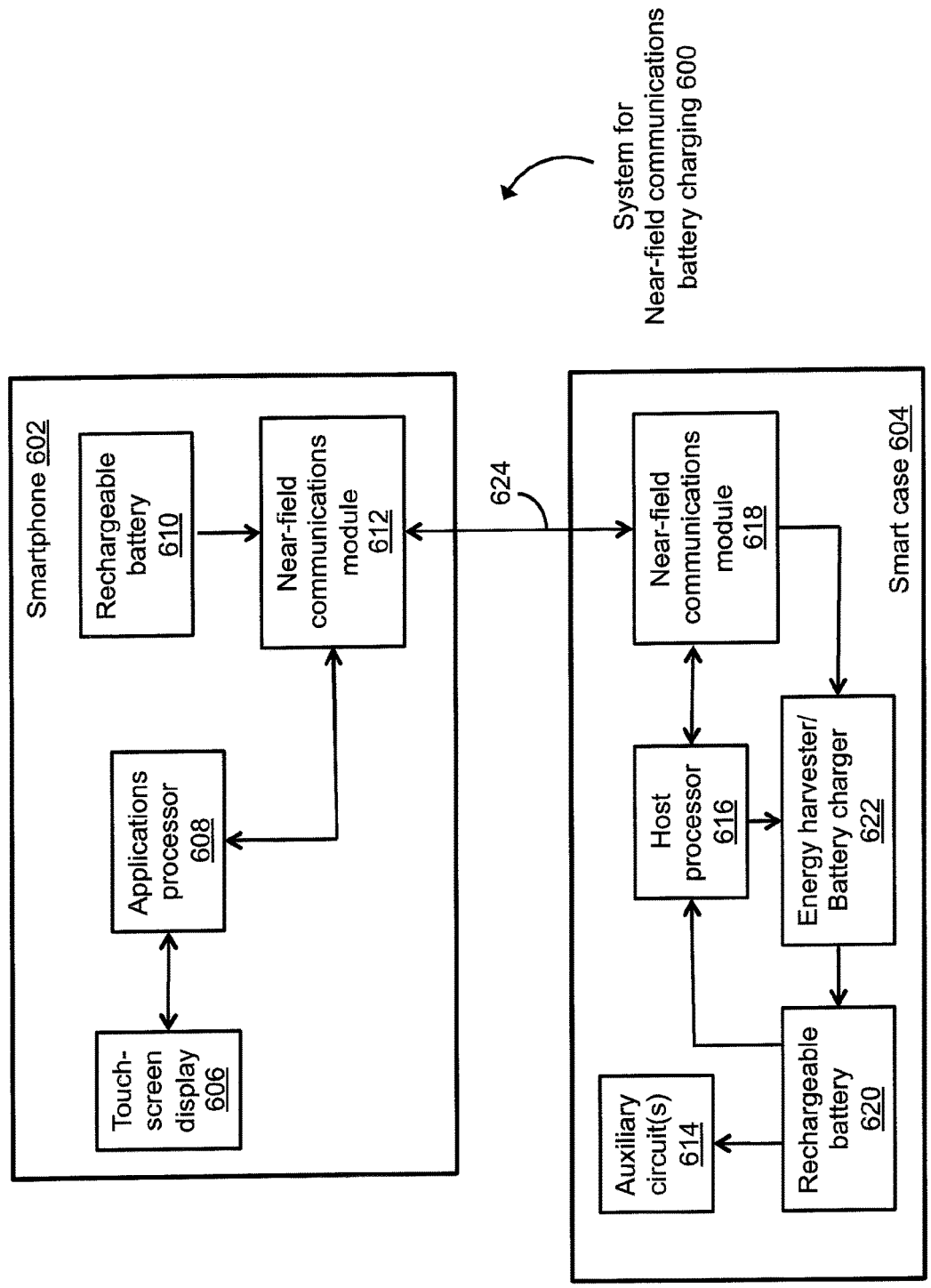
FIG. 6A is an example diagram illustrating a combination smart case and mobile communication device operable to provide near-field communications (NFC) battery charging according to embodiments herein.

FIG. 6A depicts an illustrative embodiment of an exemplary smart case 604 and smartphone 602 configured as a system 600 for NFC battery charging, in accordance with the present application.

As shown in FIG. 6A, the smart case 604 includes a host processor 616, an energy harvester/battery charger 622, a rechargeable battery 620, one or more auxiliary circuits 614, and an NFC module 618. The smartphone 602 includes a touchscreen display 606, an applications processor 608, a rechargeable battery 610, and an NFC module 612. The NFC module 618 of the smart case 604 communicates with the NFC module 612 of the smartphone 602 over a wireless data link 624.

The system 600 for NFC battery charging will be further understood with reference to the following illustrative example. In this example, a user of the system 600 employs the touchscreen display 606 of the smartphone 602 to enter selection of an application running on the applications processor 608 for charging the rechargeable battery 620 within the smart case 604 using near-field communications (NFC).

Having entered selection of the application for charging the smart case's battery using NFC, the host processor 616 can provide information about a battery charge status of the rechargeable battery 620 to the NFC module 618, which, in turn, can provide, over the wireless data link 624, the battery charge status information to the applications processor 608 via the NFC module 612. The energy harvester/battery charger 622 within the smart case 604 receives, via the NFC modules 612, 618, battery energy from the rechargeable battery 610 within the smartphone 602, and uses the battery energy to charge the rechargeable battery 620 within the smart case 604.

While the rechargeable battery 620 is being charged, the host processor 616 can provide one or more battery charge status updates to the applications processor 608, which can use the battery charge status update information to manage the battery charging, as well as provide an indication of the battery charge status to the user by way of the touchscreen display 606.

Figure 6B:
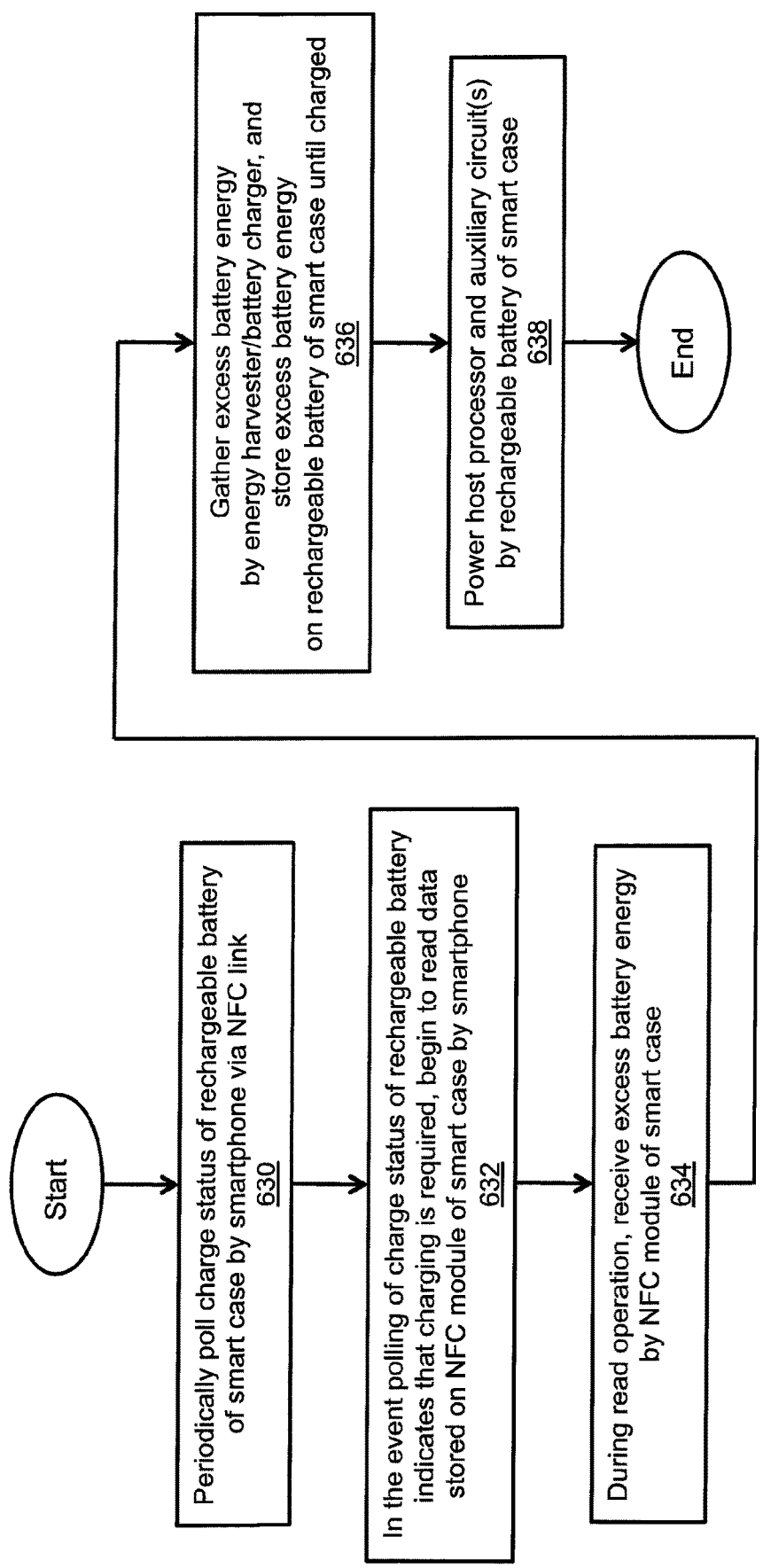
FIG. 6B is an example diagram illustrating of a method of operating the system of FIG. 6A according to embodiments herein.

A method of operating the system 600 for NFC battery charging is described herein with reference to FIG. 6B. The system 600 charges the rechargeable battery 620 of the smart case 604 by extracting power from the rechargeable battery 610 of the smartphone 602.

As depicted in block 630 (see FIG. 6B), the charge status of the rechargeable battery 620 is periodically polled by the smartphone 602 via the NFC link 620 between the smartphone 602 and the smart case 604.

As depicted in block 632, in the event the polling of the charge status of the rechargeable battery 620 indicates that charging is required, data stored on the NFC module 618 is read by the smartphone 602.

As depicted in block 634, during the read operation, excess battery energy is received by the NFC module 618 of the smart case 604.

As depicted in block 636, the excess battery energy is gathered by the energy harvester/battery charger 622, and stored on the rechargeable battery 620 of the smart case 604 until the rechargeable battery 620 is charged.

As depicted in block 638, the host processor 616 and the auxiliary circuit(s) are powered by the rechargeable battery 620.

It is noted that the charging of the rechargeable battery 620 can be controlled by the application for charging the smart case's rechargeable battery based on a battery status provided by the smart case 604 to the smartphone 602. The smartphone 602 periodically polls the smart case 604 to determine the battery charge level of the rechargeable battery 620. Based on a programmable battery charge level threshold(s) for the smartphone 602 and/or the smart case 604, the decision regarding whether or not to charge the rechargeable battery 620 of the smart case 604 is made.

Figure 7A:
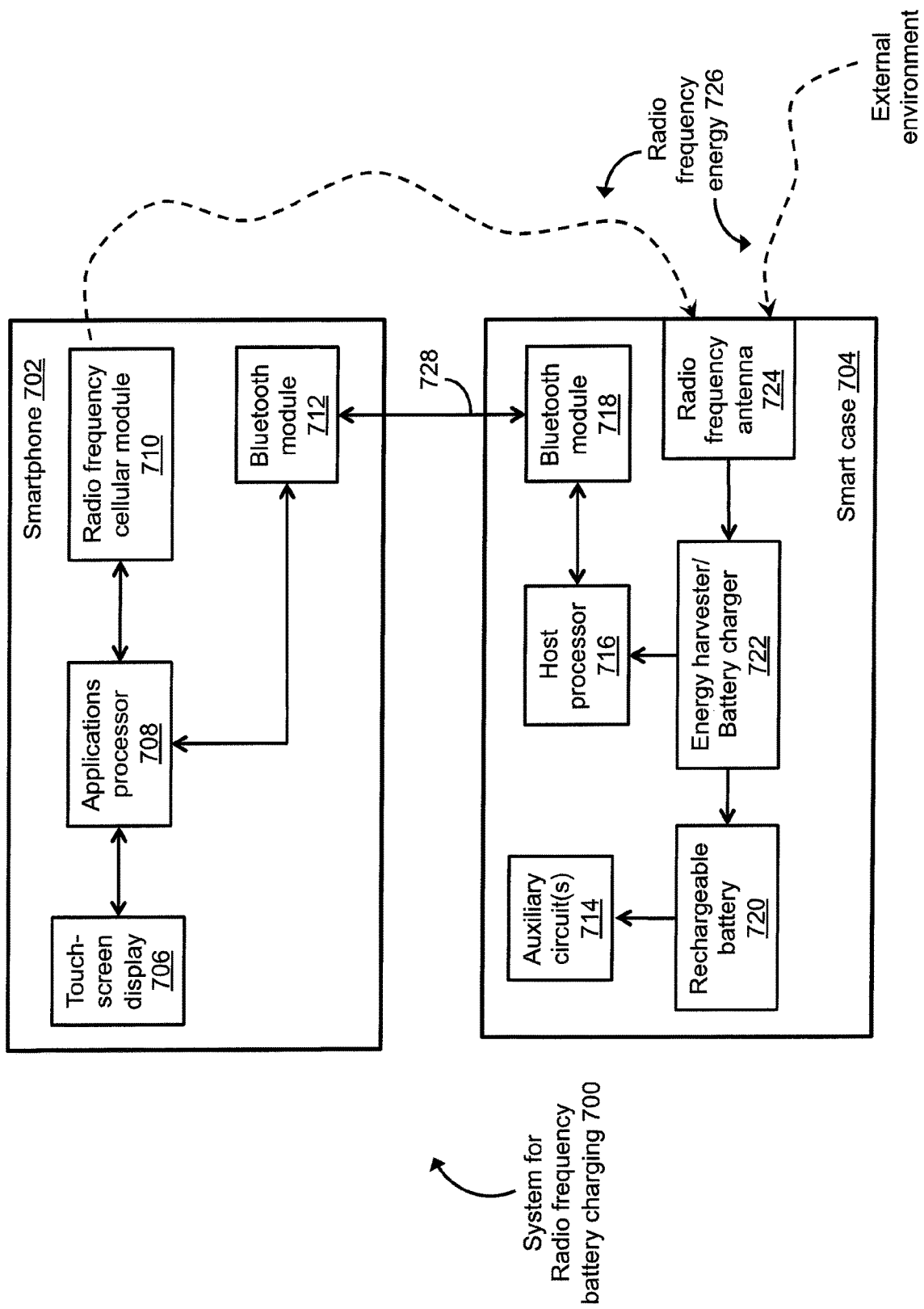
FIG. 7A is an example diagram illustrating of a combination smart case and mobile communication device operable to support radio frequency (RF) battery charging according to embodiments herein.

FIG. 7A depicts an illustrative embodiment of an exemplary smart case 704 and smartphone 702 configured as a system 700 for RF battery charging, in accordance with the present application.

As shown in FIG. 7A, the smart case 704 includes a host processor 716, an energy harvester/battery charger 722, a rechargeable battery 720, one or more auxiliary circuits 714, an RF antenna 724, and a Bluetooth module 718. The smartphone 702 includes a touchscreen display 706, an applications processor 708, an RF cellular module 710, and a Bluetooth module 712. The Bluetooth module 718 of the smart case 704 communicates with the Bluetooth module 712 of the smartphone 702 over a wireless data link 728.

The system 700 for RF battery charging will be further understood with reference to the following illustrative example. In this example, a user of the system 700 employs the touchscreen display 706 of the smartphone 702 to enter selection of an application to execute on the applications processor 708 for charging the rechargeable battery 720 within the smart case 704 using RF energy. Having entered selection of the application for charging the smart case's rechargeable battery using RF energy, the host processor 716 provides information about a battery charge status of the rechargeable battery 720 to the Bluetooth module 718, which, in turn, provides, over the wireless data link 728, the battery charge status information to the applications processor 708 via the Bluetooth module 712.

The energy harvester/battery charger 722 within the smart case 704 then receives, via the RF antenna 724, RF energy 726 from the RF cellular module 710 within the smartphone 702, as well as from the external environment, and uses the RF energy to charge the rechargeable battery 720 within the smart case 704.

While the rechargeable battery 720 is being charged, the host processor 716 provides one or more battery charge status updates to the applications processor 708, which can use the battery charge status update information to manage the battery charging, as well as provides an indication of the battery charge status to the user by way of the touchscreen display 706.

Figure 7B:
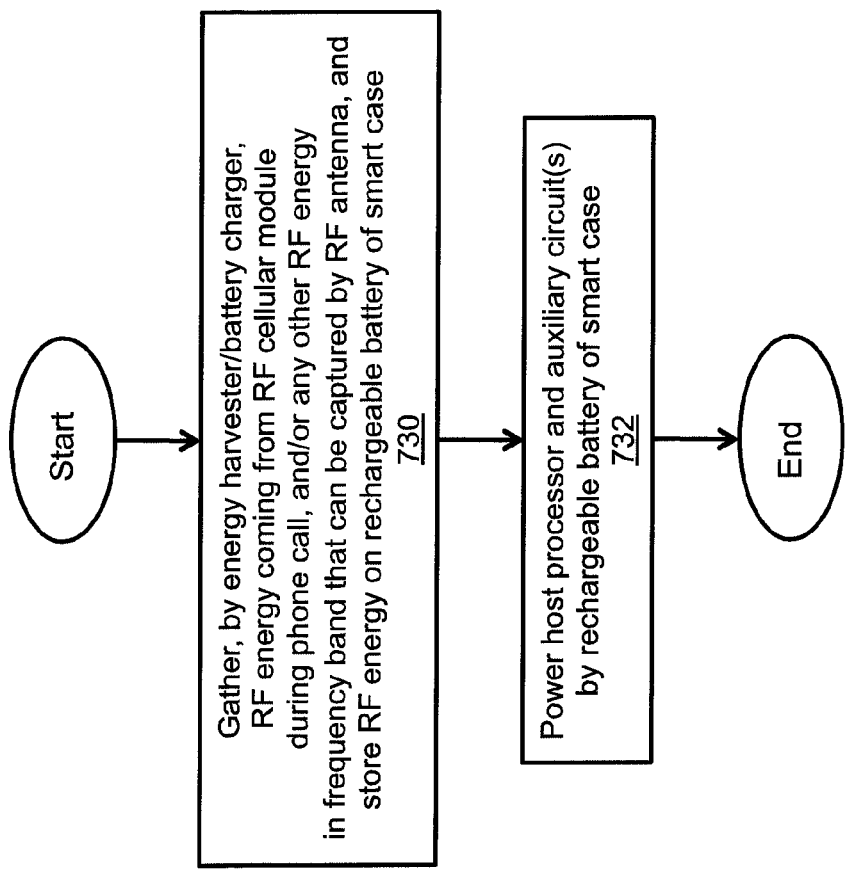
FIG. 7B is an example diagram illustrating of a method of operating the system of FIG. 7A according to embodiments herein.

A method of operating the system 700 for RF battery charging is described herein with reference to FIG. 7B.

The system 700 can charge the rechargeable battery 720 of the smart case 704 by extracting power from RF energy captured by the RF antenna 724. As depicted in block 730 (see FIG. 7B), RF energy coming from the RF cellular module 710 during a phone call, and/or any other RF energy in a frequency band that can be captured by the RF antenna 724, is gathered by the energy harvester/battery charger 722 and stored on the rechargeable battery 720 of the smart case 704.

As depicted in block 732, the host processor 716 and the auxiliary circuit(s) 714 are powered by the rechargeable battery 720 of the smart case 704.

Figure 8:
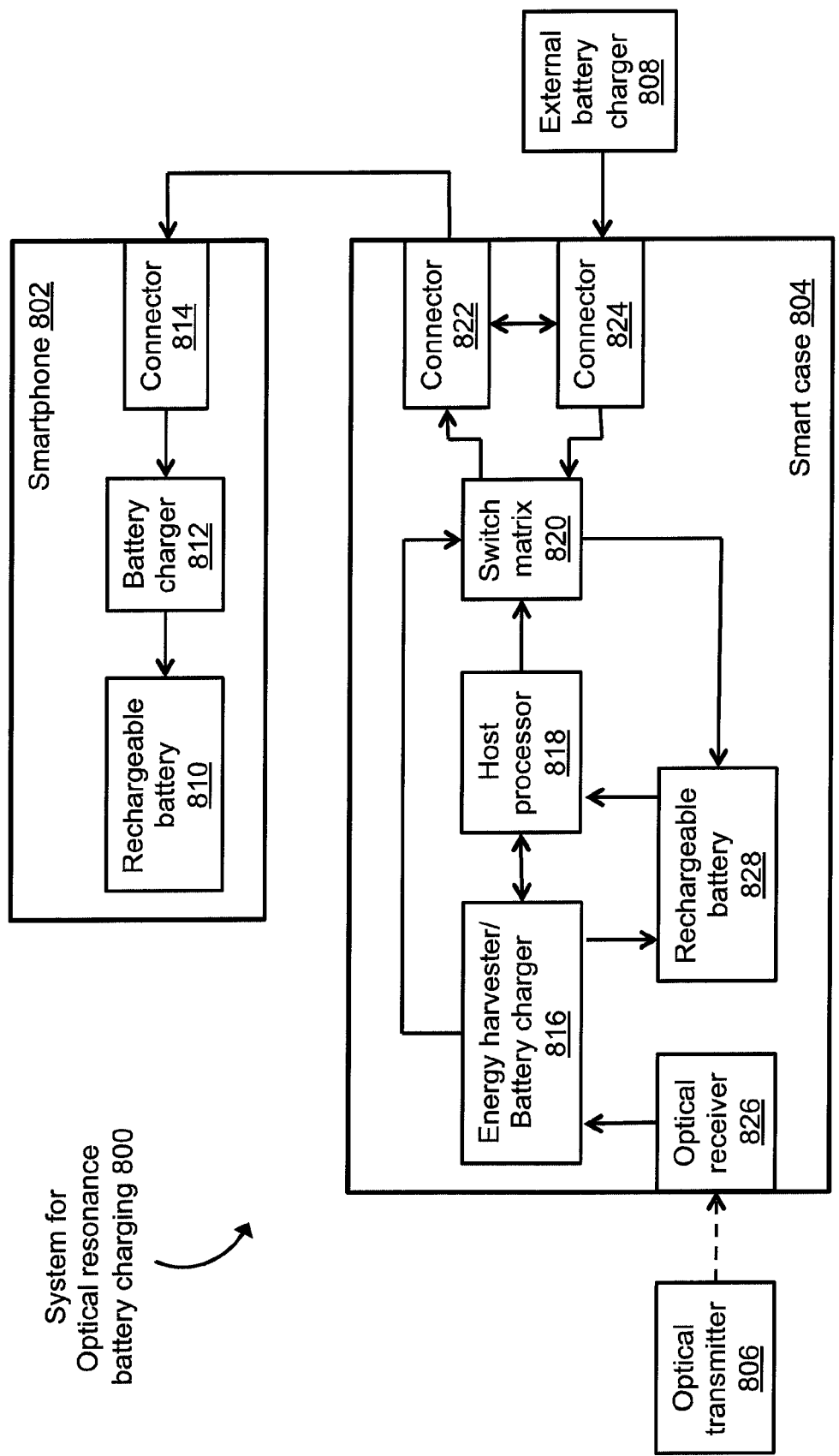
FIG. 8 is an example diagram illustrating a combination smart case and mobile communication device operable to support optical resonance battery charging according to embodiments herein.

FIG. 8 depicts an illustrative embodiment of an exemplary smart case 804 and smartphone 802 configured as a system 800 for optical resonance battery charging, in accordance with the present application.

As shown in FIG. 8, the smart case 804 includes a host processor 818, an energy harvester/battery charger 816, a rechargeable battery 828, an optical receiver 826, a switch matrix 820, and a pair of connectors 822, 824. The optical receiver 826 includes a retro-reflector or an array of retro-reflectors, which, in combination with an optical transmitter 806, forms a distributed laser resonator. The optical receiver 826 further includes an adaptive lens for maintaining lasing between the optical receiver 826 and the optical transmitter 806, as well as a photodiode or an array of photodiodes for converting optical power into electricity to charge the rechargeable battery 828.

The smartphone 802 includes a rechargeable battery 810, a battery charger 812, and a connector 814, which is adapted to make an electrical connection with the connector 822 of the smart case 804.

The system 800 for optical resonance battery charging will be further understood with reference to the following illustrative example. In this example, the optical receiver 826 receives optical power from the optical transmitter 806, and provides the optical power to the energy harvester/battery charger 816. The energy harvester/battery charger 816 harvests optical energy from the optical power, and uses the optical energy (via conversion to electricity) for charging the rechargeable battery 828, which provides information about its battery charging status to the host processor 818.

The energy harvester/battery charger 816 likewise provides optical energy to the switch matrix 820, which can be controlled by the host processor 818 to forward, via the connectors 822, 814, the optical energy to the battery charger 812 for charging the rechargeable battery 810 within the smartphone 802. In certain embodiments, the switch matrix 820 can also be controlled by the host processor 818 to connect, via the connector 824, an external battery charger 808 to the smart case 804 for charging the rechargeable battery 828, as well as the rechargeable battery 810 within the smartphone 802.

The system 800 provides a wireless external battery charging option for a user of the smart case 804 and smartphone 802. As described herein, the optical receiver 826 of the smart case 804 can include a retro-reflector (or an array of retro-reflectors). The optical receiver 826, when coupled with the external optical transmitter 806 containing an amplifying laser medium, forms a laser resonator. When lasing sets in, the optical receiver 826 converts optical power into electrical energy, which can be used to charge the rechargeable battery 828 of the smart case 804 and/or the rechargeable battery 810 of the smartphone 802.

It is noted that the smart case 804 can also support wired battery charging from the external battery charger 808. The smart case 804 includes the (male) connector 822 that plugs into the (female) USB/charging connector 814 of the smartphone 802, as well as the (female) connector 824, which can be like the female connector 814 of the smartphone 802. The switch matrix 820 can be employed to allow the male connector 822 of the smart case 804 to establish a number of electrical connections to the female connector 814 of the smartphone 802. In this way, the switch matrix 820 can provide the following battery charging options: (1) the external battery charger 808 charges the rechargeable battery 810 of the smartphone 802, (2) the external battery charger 808 charges the rechargeable battery 828 of the smart case 804, (3) the optical transmitter 806/optical receiver 826 charges the rechargeable battery 810 of the smartphone 802, and (4) the optical transmitter 806/optical receiver 826 charges the rechargeable battery 828 of the smart case 804. Such battery charging can be controlled by the smartphone app based on the connection status of the external battery charger 808, the optical power received, and/or the battery charge levels of the rechargeable battery 810 and/or the rechargeable battery 828. The system 800 can also allow a user to select the priority of the battery charging power source and/or the target rechargeable battery 810, 828.

Figure 9:
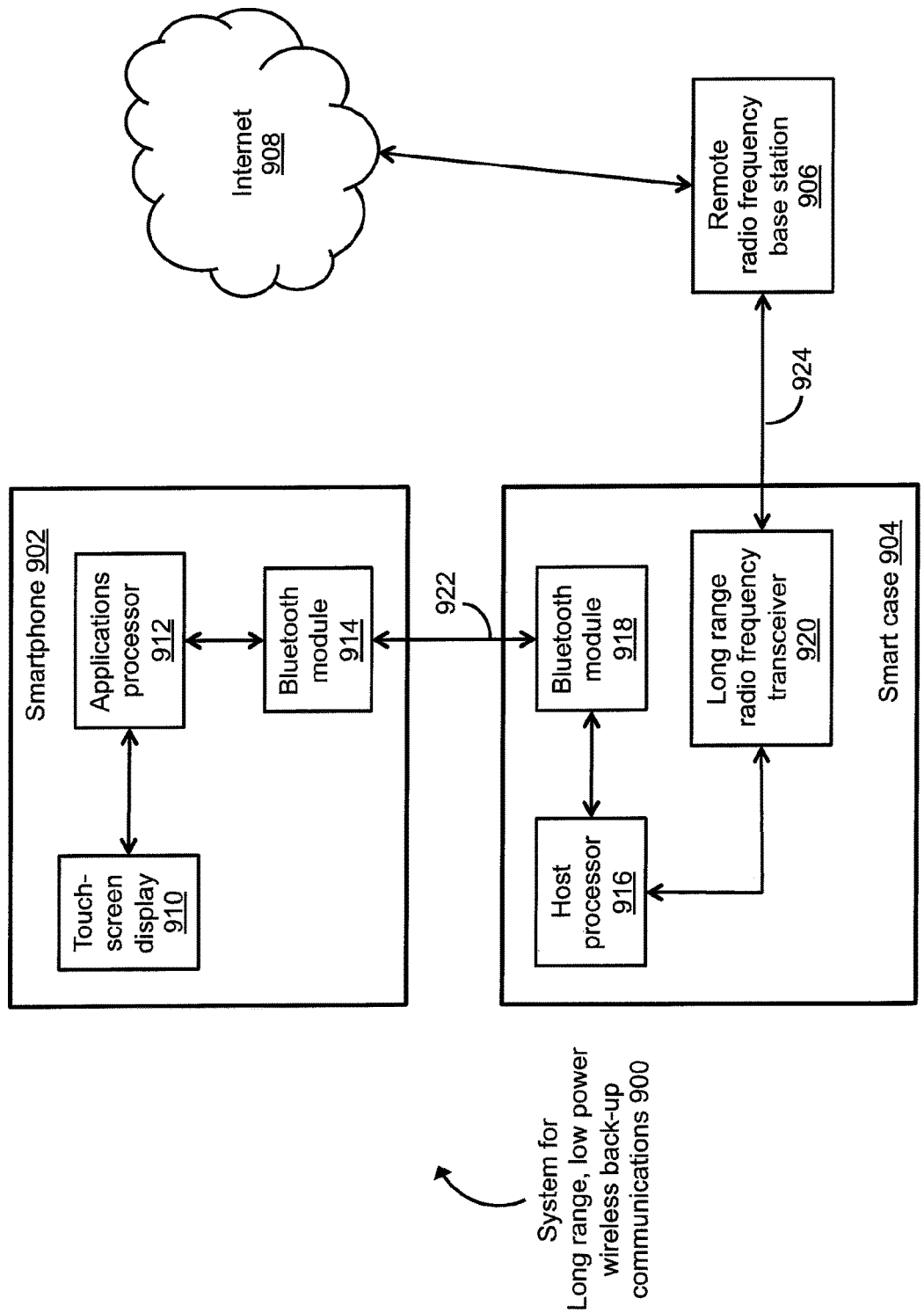
FIG. 9 is an example diagram illustrating of a combination smart case and mobile communication device operable to provide alternate long range, low power wireless back-up communications according to embodiments herein.

FIG. 9 depicts an illustrative embodiment of an exemplary smart case 904 and smartphone 902 configured as a system 900 for enabling long range, low power wireless back-up communications, in accordance with the present application.

As shown in FIG. 9, the smart case 904 includes a host processor 916, a long range RF transceiver 920, and a Bluetooth module 918. The smartphone 902 includes a touchscreen display 910, an applications processor 912, and a Bluetooth module 914. The Bluetooth module 918 of the smart case 904 communicates with the Bluetooth module 914 of the smartphone 902 over a wireless data link 922. The wireless back-up communications functionality of the system 900 can be used as an alternative to cellular data connectivity for communicating over the Internet 908. In this way, the system 900 can achieve Internet connectivity at times when cellular data networks are unreachable, or when a user wishes to avoid high data charges that might be imposed by a cellular network provider.

The system 900 for enabling long range, low power wireless back-up communications will be further understood with reference to the following illustrative example. In this example, a user of the system 900 can employ the touchscreen display 910 of the smartphone 902 to enter an app running on the applications processor 912 for setting the smartphone 902 to perform long range, low power wireless back-up communications. Having set the smartphone 902 to perform long range, low power wireless back-up communications, the smartphone 902 can communicate, via the long range RF transceiver 920, with a remote RF base station 906 over a proprietary link 924. The remote RF base station 906 can then establish a secure connection to the Internet 908, which, in turn, can provide connectivity for cloud-based information processing and/or data storage.

As described herein, the system 900 for enabling long range, low power wireless back-up communications can be used to provide Internet connectivity when cellular data networks are unreachable by the smartphone 902, or when a user chooses to avoid costly data charges imposed by a cellular network provider. The long range RF transceiver 920 uses a proprietary protocol that utilizes frequency shift keying (FSK) modulation in the unlicensed frequency band around 2.4 gigahertz (GHz), or any other suitable protocol.

The proprietary protocol can use frequency hopping and variable data rates in order to maintain connectivity to the remote RF base station 906. The remote RF base station 906 can form a bridge between the smart case 904 and the cloud-based information processing and/or data storage. This enables the smart case 904 to access cloud-based analytics and storage without using cellular data services. In certain embodiments, the remote RF base station 906 offers an "always on" service, allowing the long range RF transceiver 920 to make a request for a secure link to the remote RF base station 906 at anytime. Once the remote RF base station 906 receives the request, the smart case 904 authentication process begins. If the authentication is successful, then a secure encrypted data link can be established. It is noted that the remote RF base station 906 can service multiple clients simultaneously.

Figure 10:
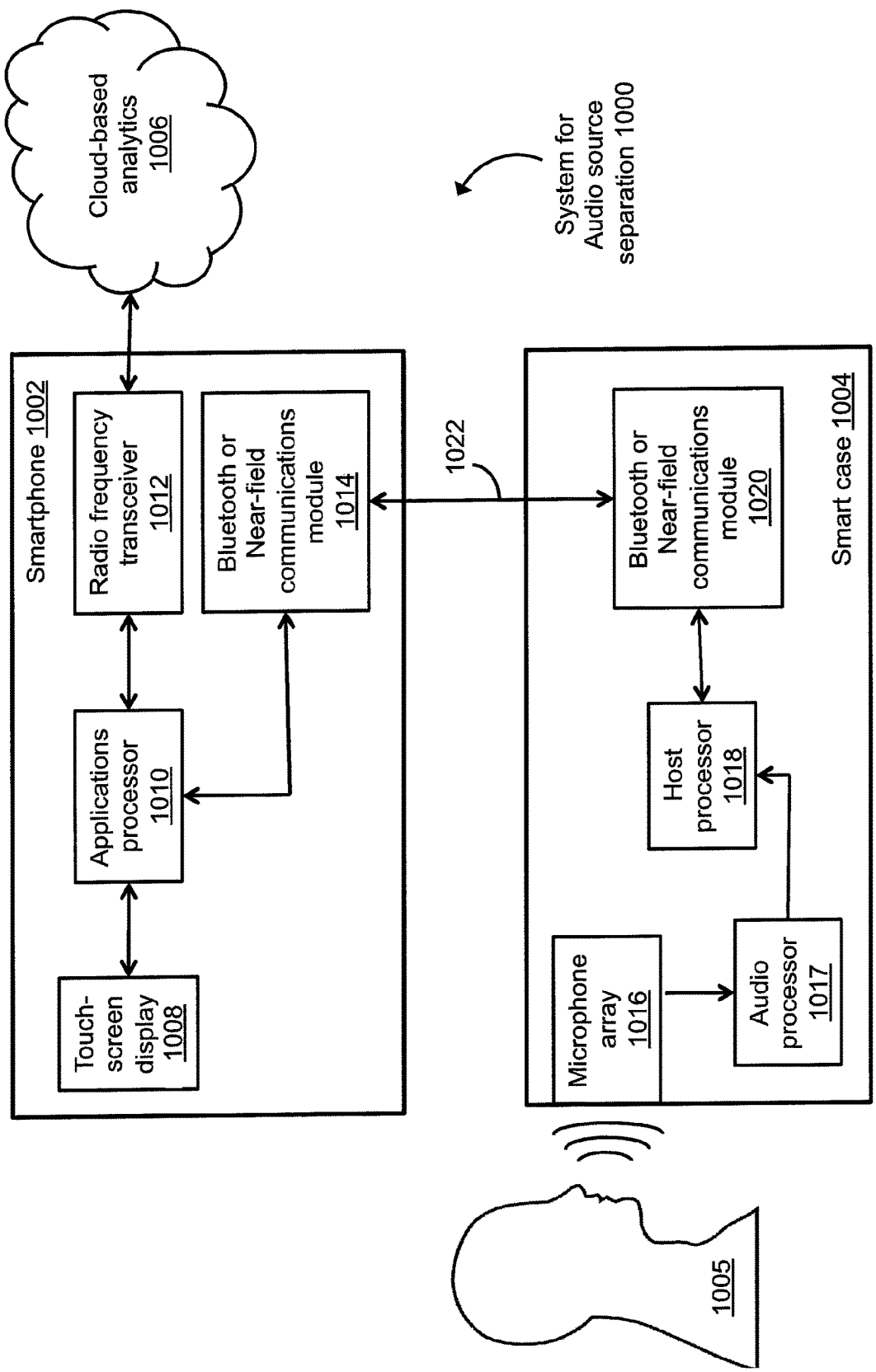
FIG. 10 is an example diagram illustrating a combination smart case and mobile communication device operable to provide audio source separation according to embodiments herein.

FIG. 10 depicts an illustrative embodiment of an exemplary smart case 1004 and smartphone 1002 configured as a system 1000 for enabling audio source separation, in accordance with the present application.

As shown in FIG. 10, the smart case 1004 includes a host processor 1018, an audio processor 1017, a microphone array 1016, and a Bluetooth or NFC module 1020. The audio processor 1017 includes digital signal processing (DSP) circuitry. The smartphone 1002 includes a touchscreen display 1008, an applications processor 1010, an RF transceiver 1012, and a Bluetooth or NFC module 1014. The Bluetooth or NFC module 1020 of the smart case 1004 communicates with the Bluetooth or NFC module 1014 of the smartphone 1002 over a wireless data link 1022.

The audio source separation functionality of the system 1000 can be employed to remove extraneous noise and improve voice recognition performance. In this way, errors that might occur when the smartphone 1002 is used to translate a user's voice input into electronic text can be reduced.

The system 1000 for enabling audio source separation will be further understood with reference to the following illustrative example. In this example, a user 1005 of the system 1000 uses the touchscreen display 1008 of the smartphone 1002 to enter selection of an application for execution on the applications processor 1010 for enabling the audio source separation functionality. Having entered the application for performing audio source separation, the user 1005 speaks directly into the microphone array 1016, which receives the user's voice input and provide a voice signal to the audio processor 1017. The DSP circuitry within the audio processor 1017 can remove any unwanted sounds from the voice signal, and sends a resulting audio stream to the host processor 1018. The host processor 1018 then provides, over the wireless data link 1022, the audio stream to the applications processor 1010, which executes one or more voice recognition algorithms for translating the user's voice input into electronic text.

For example, the applications processor 1010 may insert the electronic text produced from the user's voice input into an e-mail message, a text message, or any other suitable form of electronic communication.

It is noted that audio source separation can improve the performance of speech recognition algorithms by attenuating all audio signals with the exception of audio signals that are identified as being an audio source of interest. The smart case 1004 includes the array of microphones 1016, which can be connected to the audio processor 1017, such as the ADADN8080 audio signal processor sold by Analog Devices, Inc. The audio signal processor provides a "wake-up on voice" service, as well as provide audio source separation functionality. The "wake-up on voice" service can allow the host processor 1018 and most of the audio processor 1017 to go to sleep, and become activated upon receipt of an audio voice input. Once an audio voice signal is recognized, the audio processor 1017 reduces the audio signal to a digital data stream containing key features of speech, which can then be used by a speech recognition algorithm(s) executed by the applications processor 1010.

Figure 11:
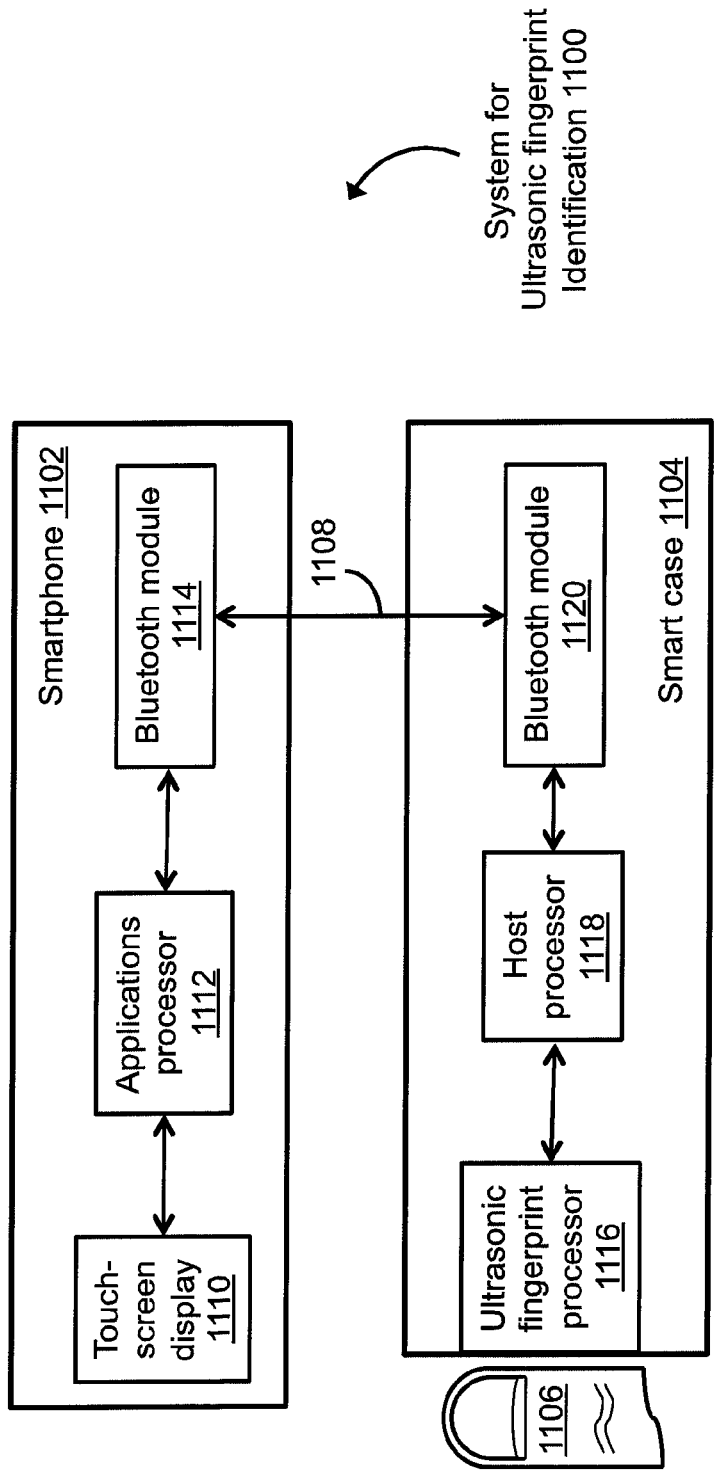
FIG. 11 is an example diagram illustrating a combination smart case and mobile communication device operable to support ultrasonic fingerprint identification according to embodiments herein.

FIG. 11 is an illustrative embodiment of an exemplary smart case 1104 and smartphone 1102 configured as a system 1100 for ultrasonic fingerprint identification, in accordance with the present application.

As shown in FIG. 11, the smart case 1104 includes an ultrasonic fingerprint processor 1116, a host processor 1118, and a Bluetooth module 1120. The smartphone 1102 includes a touchscreen display 1110, an applications processor 1112, and a Bluetooth module 1114. The Bluetooth module 1120 of the smart case 1104 communicates with the Bluetooth module 1114 of the smartphone 1102 over a wireless data link 1108.

Embodiments herein include the system 1100 for ultrasonic fingerprint identification. The system 1100 employs biometric sensing of a user's fingerprint (see reference numeral 1106; FIG. 11), which provides for a more secure and simpler user access while preventing unauthorized user access, and also provides an enhanced user experience (e.g., a faster unlock) by eliminating the need to enter pin codes and/or passwords.

In one embodiment, the smart case 1104 contains the ultrasonic fingerprint processor 1116 that provides for such user authentication. The fingerprint identification performed by the ultrasonic fingerprint processor 1116 can be used alone, or in conjunction with other vital signs monitoring (VSM) to provide a more enhanced user authentication process.

The ultrasonic fingerprint processor 1116 includes an array of piezoelectric transducers, a piezo-driver, a piezo-receiver, signal conditioning, and digitization circuitry for data reduction. The ultrasonic fingerprint processor 1116 provides a "wake-up on press" service in addition to providing fingerprint identification. The "wake-up on press" service can allow the host processor 1118 and most of the ultrasonic fingerprint processor 1116 to go to sleep, and only become activated upon a user touch input.

After a user touch signal is recognized, the ultrasonic fingerprint processor 1116 generates fingerprint data, and the host processor 1118 compares the fingerprint data to known user fingerprint data in order to determine a match for user authentication. Upon successful user authentication, the features of the smart case 1104 are unlocked, and the authorized user can be identified so that subsequent user touch inputs from the user can be properly attributed to him or her.

FIG. 12A depicts an exploded view of an example apparatus 1201 (such as a smart case) and mobile communication device 1202 (such as a smartphone, personal digital assistant, etc.) in a configuration 1200 according to embodiments herein.

As shown in FIG. 12A, the apparatus 1201 includes encasement 1204 (such as a housing) and corresponding electronic circuitry 1206.

The mobile communication device 1202 can be joined to touch or combined with the electronic circuitry 1206 as shown via arrow 1220 for subsequent insertion into the encasement 1204.

In this example embodiment, the encasement 1204 is slid in the direction of arrow 1222 to retain the combination of the electronic circuitry 1206 and mobile communication device 1202 within the encasement 1204. In such an instance, the encasement 1204 securely retains the mobile communication device 1202 and the electronic circuitry 1206 together, exposing the display screen 1207 of the mobile communication device 1202 for viewing by a respective user.

As previously discussed, the supplemental circuitry (electronic circuitry 1206 such as a printed circuit board and corresponding circuitry) can include any suitable electronics such as optical sensors, optical transmitters, acoustic sensors, electrical sensors, etc.

The electronic circuitry 1206 includes a communication interface to support communications with the mobile communication device 1220. The communications over a respective wireless communication link between the mobile communication device and the electronic circuitry 1206, the supplemental circuitry (electronic circuitry 1206 and corresponding component's) is controllable by an application on the mobile communication device 1202. Data, information, etc., collected and/or processed by the electronic circuitry 1206 is conveyed over the wireless communication link from the electronic circuitry 1206 to the mobile communication device 1220.

As further shown, the encasement 1204 includes windows, buttons, openings, etc., on a respective peripheral edge and/or planar facing of encasement 1204 to accommodate use of corresponding buttons, cameras, optical transmitters, optical receivers, electrodes, etc., disposed on the mobile communication device 1202 and/or the electronic circuitry 1206.

Note that the apparatus 1201 as discussed herein can be presented in any suitable form factor. For example, in one embodiment the electronic circuitry 1206 is separate and removable with respect to the encasement 1204. Alternatively, note that the electronic circuitry 1204 can be fixedly integrated into the encasement 1204 (not removable) such that the user only needs to slide the mobile communication device 1202 into the respective encasement 1204.

FIG. 12B is an example diagram illustrating a combination of the mobile communication device 1202 and the corresponding electronic circuitry 1206 after it has been inserted into the encasement 1204 according to embodiments herein.

As previously discussed, the apparatus 1201 enhances functionality of a respective mobile communication device 1202. As previously discussed, the apparatus 1206 includes an encasement 1204 (such as protective housing) and corresponding electronic circuitry 1206 (such as supplemental circuitry) to provide expanded capabilities to the mobile communication device 1202. As further shown, the encasement 1204 retains both the mobile communication device 1202 and the electronic circuitry 1206 into a single handheld device.

In one embodiment, the electronic circuitry 1206 includes a first optical transmitter/receiver pair, both disposed at location 1218. The electronic circuitry 1206 can include a second optical transmitter/receiver pair disposed at location 1219. The electronic circuitry 1206 is operable to: i) control each of the optical transmitters that locations 1218 and 1219, ii) monitor the optical receivers at locations 1218 and 1219, and iii) communicate with the mobile communication device 1202 over a communication link to convey collected and/or processed data in a manner as previously discussed.

In accordance with further embodiments, the communication link between the mobile communication device 1202 and the electronic circuitry 1206 is a wireless communication link between the supplemental circuitry and a respective wireless interface of the mobile communication device. As previously discussed with respect to FIG. 5A, the first transmitter/receiver pair can be used to monitor first bio media such as finger 510 on the right hand of a person; the second transmitter/receiver pair can be used to monitor second bio media such as finger 512 on a left hand of the person.

In accordance with yet further embodiments, the application executing on the mobile communication device 1202 is operable to generate commands to cause the optical transmitter at location 1218 to irradiate the finger 510 with optical energy; the commands also cause the optical transmitter at location 1219 to irradiate finger 512

The optical receiver at location 1218 detects the portion of optical energy reflected off the finger 510. The optical receiver at location 1219 detects the portion of optical energy reflected off the finger 512.

The electronic circuitry 1206 analyzes the received optical signals as previously discussed and conveys attributes of the detected optical signals at location 1218 and location 1219 to the application on the mobile communication device 1202.

The electronic circuitry 1206 optionally includes a spectrometer to perform a spectral analysis of wavelengths of the optical energy reflected off the material under test (finger 510 and finger 512 as previously discussed) to produce spectral information indicating spectral intensity of optical energy reflected off were through the matter under test at different wavelengths.

The electronic circuitry for 1206 forwards the spectral information or other collected data to the application on the mobile communication device 1202.

In one embodiment, spectral information generated by the electronic circuitry 106 can be used for any suitable purpose. For example, in one embodiment, the mobile communication device 1202 is operable to receive feedback information (spectral information, spectral analysis, etc.) of one or more optical signals detected by the optical receivers at locations 1218 and 1219. The application of the mobile communication device generates a PPG (PhotoPlethysmoGraphy) metric based on the feedback information. The application optionally displays the PPG metric on a respective display screen 1207 of the mobile communication device 1202. Accordingly, the PPG metric is derived from one or more optical signals sensed by the optical receivers applications 1218 and 1219.

As further shown in FIG. 12B, the electronic circuitry 1206 (supplemental circuitry with respect to the mobile communication device 1202) can further include a first electrode 1216 and a second electrode 1214 disposed on an exposed surface of the encasement 1204 and electronic circuitry 1206 to detect an impedance of bio-media (respective fingers 510 and 512) in contact with the first electrode 1216 and the second electrode 1214. The mobile communication device 1202 displays an ECG (ElectroCardioGraphy) metric on a display screen 1207 of the mobile communication device 1202; the ECG metric is derived from the detected impedance across electrodes 1216 and 1214.

As previously discussed, in addition to sensing impedance of bio media (fingers 510 and 512) in contact between the first electrode 1216 and the second electrode 1214, the electronic circuitry 1206 produces a PPG (PhotoPlethysmoGraphy) metric based on the feedback information (spectral analysis of a portion of the optical signal reflected off the bio media (fingers 510 and 512) of the user. The application of the mobile communication device 1206 can be configured to use the ECG metric and the PPG metric to derive a blood pressure metric. The mobile communication device 1202 is operable to display the blood pressure metric on the display screen 1207 of the mobile communication device 1202; the blood pressure metric is calculated based at least in part on the detected impedance and attributes of one or more optical signal reflected off the bio-media (fingers 510 and 512) as detected by the optical receivers at locations 1218 and 1219.

FIG. 12C is an example diagram illustrating a perspective view diagram (handheld device) of a mobile communication device and corresponding electronic circuitry retained within an encasement according to embodiments herein.

As shown, the optical transmitter (such as source 118 and optical module 120) can be disposed at location 1208 to irradiate the material under test 160 and receive reflected optical energy 193 as previously discussed with respect to FIG. 1A. Encasement 1204 includes window 1210 (i.e., opening, port, etc.) to enable the respective mobile communication device 1202 and/or electronic circuitry 1206 to capture images using a respective image sensor device. The source 118 (at location 1208) transmits respective optical energy orthogonal to an axis in which a respective camera 1210 of the mobile communication device 1202 captures respective images. This allows the user to view display screen 1207 while the respective optical transmitter and optical receiver at location 1208 are used to monitor a respective material under test 106.

In accordance with yet further embodiments, the mobile communication device 1202 includes a camera in which to capture an image of a material under test 106 along x-axis. The electronic circuitry 1206 as discussed herein controls the optical transmitter at location 1208 to irradiate the material under test 106 along y-axis (which is orthogonal to the x-axis).

As previously discussed, the electronic circuitry 1206 includes a spectrometer to perform a spectral analysis of the optical energy reflected off or through the material under test 106 back to a respective optical receiver at location 1208. The electronic circuitry 1206 communicates results of the spectral analysis over a wireless communication link to the application on the mobile communication device 1206. The application uses the spectral information and the captured image obtained via camera 1210 of the mobile communication device 1202. The captured image indicates a size and/or quantity of the material under test 106. The application on the mobile communication device 1202 uses the captured image of the material under test 106 and the spectral information to estimate an amount of at least one component present in the material under test 106. The application then displays the amount of at least one component and identity of matter present in the material under test on a display screen 1207 of the mobile communication device 1202.

Figure 13:
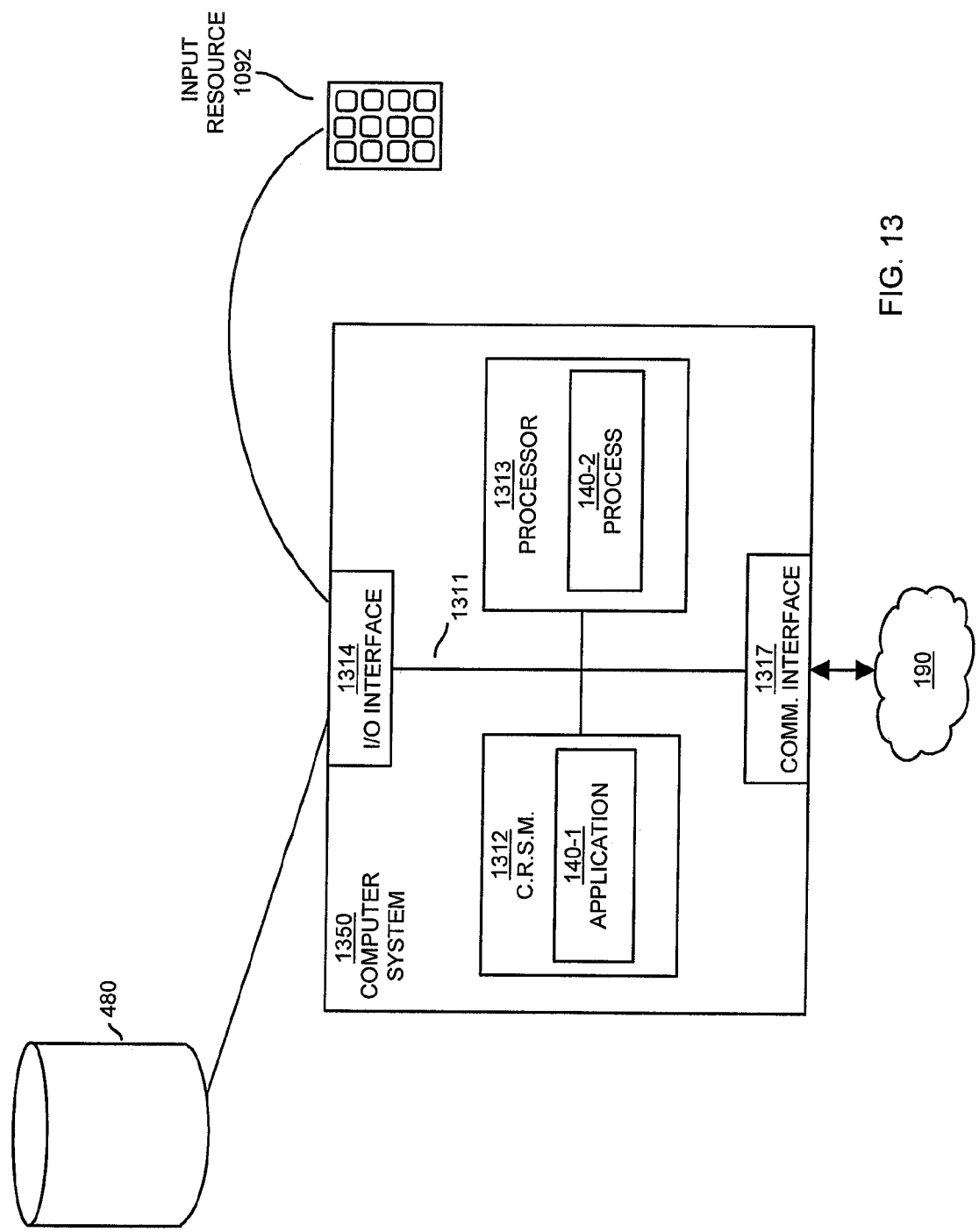
FIG. 13 is an example block diagram of a computer apparatus for implementing any of the operations as discussed herein according to embodiments herein.

FIG. 13 is an example block diagram of a computer apparatus for implementing any of the operations as discussed herein according to embodiments herein.

Any of the resources (e.g., electronic circuitry 1206, supplemental circuitry, circuitry and smart cases 104, 204, 304, 404, 504, 604, 704, 804, 904, 1004, 1104, application of mobile communication device, applications processor 112, etc.) can be configured to include a processor and executable instructions to carry out the different operations as discussed herein.

As shown, computer system 1350 of the present example includes an interconnect 1311 that couples computer readable storage media 1312 such as a non-transitory type of media or medium (i.e., any type of hardware storage medium) in which digital information can be stored and retrieved, a processor 1313 (computer processor hardware), I/O interface 1314, etc.

Computer readable storage medium 1312 can be or include any hardware storage device such as memory, optical storage, hard drive, floppy disk, etc. In one embodiment, the computer readable storage medium 1312 stores instructions and/or data.

As shown, computer readable storage media 1312 can be encoded with application 140-1 (e.g., including instructions) to carry out any of the operations as discussed herein.

During operation of one embodiment, processor 1313 accesses computer readable storage media 1312 via the use of interconnect 1311 in order to launch, run, execute, interpret or otherwise perform the instructions in application 140-1 stored on computer readable storage medium 1312. Execution of the application 140-1 produces process 140-2 to carry out any of the operations and/or processes as discussed herein.

Those skilled in the art will understand that the computer system 1350 can include other processes and/or software and hardware components, such as an operating apparatus that controls allocation and use of hardware resources to application 140-1.

The computer system 1350 may reside at any location in electronic circuitry or supplemental circuitry of the apparatus 1201 to implement any functionality of application 140-1 as discussed herein.

Functionality supported by the different resources as discussed herein will now be discussed via the flowchart in FIG. 14. Note that the steps in the flowcharts below can be executed in any suitable order.

Figure 14:
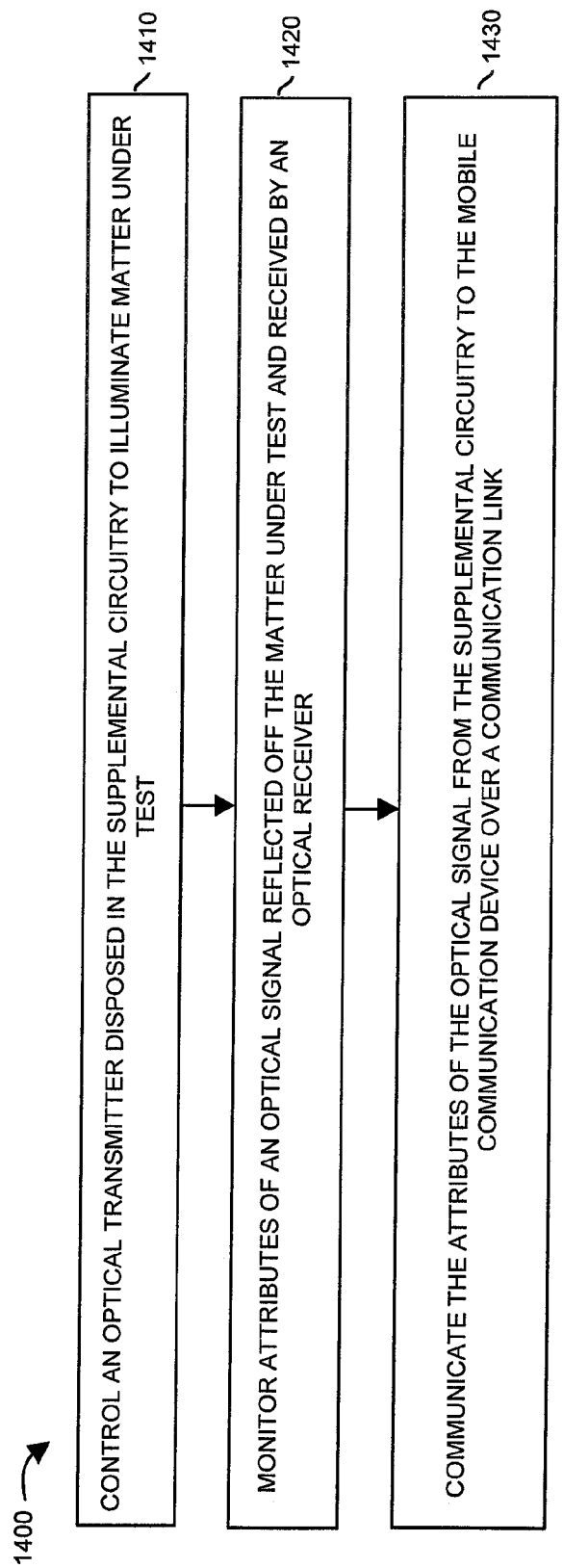
FIG. 14 is a flowchart illustrating an example method according to embodiments.

FIG. 14 is a flowchart 1400 illustrating an example method according to embodiments. Note that there will be some overlap with respect to concepts as discussed above.

In processing operation 1410, the electronic circuitry 1206 controls an optical transmitter in the electronic circuitry 1206 to illuminate matter under test 106 (such as food, bio-media, substance, etc.).

In processing operation 1420, the electronic circulate 1206 monitors attributes of an optical signal reflected off the matter under test and received by an optical receiver in the electronic circuitry 1206.

In processing operation 1430, the electronic circuitry 1206 communicates the attributes of the optical signal from the electronic circuitry 1206 (retained in an encasement 1204 with the mobile communication device 1202) over a communication link to an application executed on the mobile communication device 1202.

Note again that techniques herein are well suited to provide enhanced functionality to a mobile communication device. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, apparatus, etc., that would be known by one of ordinary skill have not been described in detail so as not to obscure claimed subject matter. Some portions of the detailed description have been presented in terms of algorithms or symbolic representations of operations on data bits or binary digital signals stored within a computing apparatus memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. An apparatus to enhance functionality of a mobile communication device, the apparatus comprising:
   electronic circuitry including an optical transmitter and an optical receiver, the electronic circuitry being supplemental circuitry with respect to the mobile communication device, the electronic circuitry operable to:
   i) receive commands over a communication link from a hyper-spectral imaging application on the mobile communication device and execute the commands to control the optical transmitter, ii) monitor the optical receiver, and
iii) communicate with the mobile communication device over a communication link; and
an encasement in which to retain the mobile communication device and the electronic circuitry, wherein the optical receiver and the optical transmitter are configured to monitor attributes of matter external to the encasement;
wherein the electronic circuitry is operable to control the optical transmitter to irradiate the matter;
wherein the electronic circuitry includes a spectrometer to perform a spectral analysis of optical energy reflected off the matter and generate image data; and
wherein the electronic circuitry is operable to reduce the image data by converting the image data from a first spatial mapping of light intensity to a second mapping of intensity versus wavelength to generate reduced image data, and to convey attributes of an optical signal detected by the optical receiver including the reduced image data to the hyper-spectral application on the mobile communication device, and
wherein the electronic circuitry transmits the reduced image data to a cloud-based analytics for hyper-spectral imaging and transmission to the hyper-spectral imaging application on the mobile communication device.

2. The apparatus as in claim 1, wherein the communication link is a wireless communication link between the electronic circuitry and a respective wireless interface of the mobile communication device.

3. The apparatus as in claim 1, wherein both the electronic circuitry and the mobile communication device are separate and removable with respect to the encasement.

4. The apparatus as in claim 1, wherein the electronic circuitry is fixedly integrated into the encasement.

5. The apparatus as in claim 1, wherein the application is operable to generate the commands to cause the optical transmitter to irradiate the matter with optical energy; and
wherein the optical signal detected by the optical receiver represents a portion of the optical energy reflected off the matter.

6. The apparatus as in claim 5, wherein the spectrometer performs a spectral analysis of wavelengths of the optical energy reflected off the matter and produces spectral information indicating spectral intensity of the reflected optical energy at different wavelengths;
wherein the attributes of the detected optical signal conveyed to the hyper-spectral application includes the spectral information; and
wherein the application is operable to use the spectral information as a basis to identify at least one component present in the matter.

7. The apparatus as in claim 1, wherein the mobile communication device includes a camera in which to capture an image of the matter;
wherein the electronic circuitry is operable to communicate results of the spectral analysis over the communication link to the hyper-spectral application; and
wherein the application is operable to use the spectral information and the captured image of the matter to estimate an amount of at least one component present in the matter.

8. The apparatus as in claim 1, wherein the hyper-spectral imaging application in the mobile communication device is operable to receive feedback information of an optical signal detected by the optical receiver; and
wherein the hyper-spectral imaging application of the mobile communication device is operable to generate a PPG (PhotoPlethysmoGraphy) metric based on the feedback information.

9. The apparatus as in claim 1 further comprising:
a first electrode and a second electrode disposed on an exposed surface of the encasement to detect an impedance of bio-media in contact with the first electrode and the second electrode.

10. The apparatus as in claim 1 further comprising:
a first electrode and a second electrode disposed on an external surface of the encasement, the electronic circuitry including an impedance measurement interface to monitor an impedance across the first electrode and the second electrode; and
wherein the first electrode is disposed on the encasement adjacent to a location of the optical receiver and the optical transmitter.

11. A method of enhancing functionality of a mobile communication device via supplemental circuitry wherein the supplemental circuitry and the mobile communication device are retained in an encasement, the method comprising:
via the supplemental circuitry retained in the encasement:
receiving commands over a communication link from a hyper-spectral-imaging application on the mobile communication device and executing the commands to control an optical transmitter disposed in the supplemental circuitry to irradiate matter under test, wherein the matter under test is external to the encasement;
monitoring attributes of an optical signal reflected off the matter under test and received by an optical receiver;
performing, by a spectrometer disposed in the supplemental circuitry, a spectral analysis of optical energy reflected off the matter under test and generating image data;
reducing the image data by converting the image data from a first spatial mapping of light intensity to a second mapping of intensity versus wavelength to generate reduced image data;
conveying attributes of an optical signal detected by the optical receiver including the reduced image data to the hyper-spectral application on the mobile communication device; and
communicating the attributes of the optical signal from the supplemental circuitry to a cloud-based analytics for hyper-spectral imaging and transmission to the hyperspectral imaging application on the mobile communication device over the communication link.

12. The method as in claim 11 further comprising:
via a communication interface in the electronic circuitry, receiving commands over the communication link from the hyper-spectral imaging application on the mobile communication device, the commands indicating how to control the optical transmitter; and
communicating the attributes of the optical signal detected by the optical receiver to the hyper-spectral imaging application on the mobile communication device.

13. The method as in claim 12, wherein controlling the optical transmitter disposed in the supplemental circuitry to irradiate the matter under test includes:
in accordance with the commands, irradiating the matter under test with optical energy, the optical signal detected by the optical receiver representing a portion of the optical energy reflected off the matter under test.

14. The method as in claim 13 wherein performing the spectral analysis further comprises:

performing spectral analysis of wavelengths of the optical signal;

based on the spectral analysis, producing spectral information indicating spectral intensity of the reflected optical energy at different wavelengths, wherein the attributes of the optical signal are captured by the spectral information; and communicating the spectral information from the electronic circuitry to the hyper-spectral imaging application on the mobile communication device, the hyper-spectral imaging application operable to use the spectral information as a basis to identify at least one component present in the matter under test.

15. The method as in claim 11 further comprising:

generating a PPG (PhotoPlethysmoGraphy) metric based on the attributes of the optical signal.

16. The method as in claim 11 further comprising:

monitoring a first electrode and a second electrode disposed on an external surface of the encasement to detect an impedance of bio media between the first electrode and the second electrode.

17. The method as in claim 16 further comprising:

initiating display of an ECG (ElectroCardioGraphy) metric on a display screen of the mobile communication device, the ECG metric derived from the detected impedance.

18. The method as in claim 11 further comprising:

via the supplemental circuitry, tracking a timing of the detected attributes of the optical signal and a timing of an impedance signal detected across a first electrode and a second electrode of the encasement.

19. A non-transitory computer-readable storage medium having instructions stored thereon, the instructions, when executed by computer processor hardware, cause the computer processor hardware to:

receive commands over a communication link from a hyper spectral imaging application on a mobile communication device and execute the commands to control an optical transmitter disposed in supplemental circuitry to illuminate matter under test, the supplemental circuitry providing enhanced functionality to the mobile communication device, wherein the supplemental circuitry and the mobile communication device are retained in an encasement, and wherein the matter under test is external to the encasement;

monitor attributes of an optical signal reflected off the matter under test and received by the optical receiver;

perform, by a spectrometer disposed in the supplemental circuitry, hyper-spectral imaging and a spectral analysis of optical energy reflected off the matter under test and generate image data;

reduce the image data by converting the image data from a first spatial mapping of light intensity to a second mapping of intensity versus wavelength to generate reduced image data;

convey attributes of an optical signal detected by the optical receiver including the reduced image data to the hyper-spectral application on the mobile communication device; and communicate the attributes of the optical signal from the supplemental circuitry to a cloud-based analytics for hyper-spectral imaging and transmission to the hyper-spectral imaging application on the mobile communication device over the communication link.

20. The non-transitory computer-readable storage medium of claim 19, wherein the instructions, when executed by computer processor hardware, further cause the computer processor hardware to:

via a communication interface in the electronic circuitry, receive commands over the communication link from the hyper-spectral imaging application on the mobile communication device, the commands indicating how to control the optical transmitter; and communicate the attributes of the optical signal detected by the optical receiver to the hyper-spectral imaging application on the mobile communication device.

* * * * *